US010214083B2

(12) United States Patent
Kato

(10) Patent No.: US 10,214,083 B2
(45) Date of Patent: Feb. 26, 2019

(54) VEHICLE BACK DOOR DEVICE

(71) Applicant: TOYOTA JIDOSHA KABUSHIKI KAISHA, Toyota-shi (JP)

(72) Inventor: Hiroyuki Kato, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 8 days.

(21) Appl. No.: 15/667,762

(22) Filed: Aug. 3, 2017

(65) Prior Publication Data

US 2018/0086185 A1 Mar. 29, 2018

(30) Foreign Application Priority Data

Sep. 26, 2016 (JP) .................. 2016-187597

(51) Int. Cl.

| B60J 5/10 | (2006.01) |
|---|---|
| B62D 25/10 | (2006.01) |
| E05B 79/22 | (2014.01) |
| B62D 25/12 | (2006.01) |
| B60J 5/00 | (2006.01) |
| E05B 79/00 | (2014.01) |
| E05F 5/02 | (2006.01) |
| E05D 5/06 | (2006.01) |

(52) U.S. Cl.
CPC .............. B60J 5/107 (2013.01); B62D 25/10 (2013.01); B62D 25/12 (2013.01); E05B 79/22 (2013.01); B60J 5/00 (2013.01); E05B 79/00 (2013.01); E05D 2005/067 (2013.01); E05F 5/022 (2013.01)

(58) Field of Classification Search
CPC .......... B62D 25/12; B62D 25/10; B60J 5/107; B60J 5/00; E05B 79/22; E05B 79/00; E05D 2005/067; E05F 5/022
USPC .......................................................... 296/76
See application file for complete search history.

(56) References Cited

U.S. PATENT DOCUMENTS

| 4,688,844 A * | 8/1987 | Hirose | B60J 5/101 |
|---|---|---|---|
| | | | 296/106 |
| 6,068,275 A * | 5/2000 | Chino | B60G 9/02 |
| | | | 280/124.112 |
| 6,318,782 B1 * | 11/2001 | Suzuki | B60J 5/106 |
| | | | 296/106 |
| 6,325,962 B1 * | 12/2001 | Kmiecik | B29C 49/4802 |
| | | | 264/515 |

(Continued)

FOREIGN PATENT DOCUMENTS

| JP | 2001-012145 | 1/2001 |
|---|---|---|
| JP | 2004-150170 | 5/2004 |

(Continued)

*Primary Examiner* — Pinel E Romain
(74) *Attorney, Agent, or Firm* — Oblon, McClelland, Maier & Neustadt, L.L.P.

(57) ABSTRACT

The present disclosure provides a vehicle back door device that improves workability when mounting a damper. The vehicle body-side mounting portion of the damper is positioned in a vehicle up-down direction and in vehicle front-rear direction relative to the bracket, by abutting an abutting piece provided at a vehicle body-side mounting portion of the damper against a positioning portion of a bracket. Further, by moving the abutting piece in a vehicle transverse direction, the vehicle body-side mounting portion of the damper can be supported by a pin of the bracket.

8 Claims, 14 Drawing Sheets

(56) References Cited

U.S. PATENT DOCUMENTS

| | | | | |
|---|---|---|---|---|
| 7,357,437 B2* | 4/2008 | Kuhr | ................. | B60J 7/205 |
| | | | | 296/107.08 |
| 7,673,929 B2* | 3/2010 | Patzer | ................. | E05F 5/00 |
| | | | | 296/146.11 |
| 9,637,955 B2* | 5/2017 | Elia | ................. | B60J 5/104 |
| 2005/0001444 A1* | 1/2005 | Sakai | ................. | E05F 15/603 |
| | | | | 296/56 |
| 2012/0000304 A1* | 1/2012 | Hamminga | ................. | E05F 15/622 |
| | | | | 74/89.23 |

FOREIGN PATENT DOCUMENTS

| | | | | |
|---|---|---|---|---|
| JP | 2006-161467 | | 6/2006 | |
| JP | 2018052177 A | * | 4/2018 | ............. B60J 5/107 |
| WO | WO-2011058658 A1 | * | 5/2011 | ............. B60J 5/101 |

* cited by examiner

VEHICLE BACK DOOR DEVICE

CROSS-REFERENCE TO RELATED APPLICATION

The application is based on and claims priority under 35 USC 119 from Japanese Patent Application No. 2016-187597 filed on Sep. 26, 2016, the disclosure of which is incorporated by reference herein.

BACKGROUND

Technical Field

The present disclosure relates to a vehicle back door device.

Related Art

Technology relating to a door opening/closing device that is provided with damper means (i.e. a damper) that joins a vehicle main body to a vehicle door (i.e., a back door), and with driving means for opening and closing a door, is disclosed in Japanese Patent Application Laid-Open (JP-A) No. 2004-150170. In this prior technology, a structure is employed in which the damper and the driving means are mounted to the vehicle main body via a single mounting bracket. More specifically, the damper is assembled to the vehicle main body using what is known as a ball joint mechanism in which a ball socket provided at the damper side is externally fitted over a ball stud provided at the bracket side.

However, in JP-A No. 2004-150170, in order to externally fit the ball socket over the ball stud (i.e., in order to perform an external fitting task), force is required to press the ball socket over the ball stud. Due to the above, an operator performs this external fitting task in as close proximity as possible to the ball stud.

Accordingly, if, for example, the ball stud is provided deep in the interior of the luggage space, the operator needs to lean forward into the interior of the luggage space from the rearward side of the vehicle, and to externally fit the ball socket over the ball stud while stretching their arms out as far as possible. Due to the above, workability is extremely poor when assembling the damper to the vehicle main body, and the time required to complete the operation increases correspondingly.

SUMMARY

The present disclosure provides a vehicle back door device that may improve the workability when mounting a damper.

A first aspect of the present disclosure is a vehicle back door device including: a back door supported such that the back door is able to open and close at a vehicle main body; and a damper provided such that the damper is able to extend and retract between the vehicle main body and the back door, the damper including one end portion in an extension/retraction direction mounted to the vehicle main body via a bracket fixed to the vehicle main body and another end portion in the extension/retraction direction mounted to the back door, and the damper dampening urging force that urges the back door in a direction in which the back door opens, the bracket including: a supporting portion that supports the one end portion in the extension/retraction direction of the damper; and a positioning portion formed facing the supporting portion in a vehicle transverse direction, the positioning portion being abutted against by an abutting portion provided at the one end portion in the extension/retraction direction of the damper, the supporting portion including: a supporting wall disposed along a vehicle front-rear direction and a vehicle up-down direction; and a pin provided at the supporting wall, an axial direction of the pin extending in the vehicle transverse direction, a first distance in the vehicle up-down direction between an upper end surface of the positioning portion and an axial center of the pin being set to be equal to a second distance in the vehicle up-down direction between a lower surface of the abutting portion and a hole center of an insertion hole provided in the abutting portion, and a third distance in the vehicle front-rear direction between a rear end surface of the positioning portion and an axial center of the pin being set to be equal to a fourth distance in the vehicle front-rear direction between a front surface of the abutting portion and the hole center of the insertion hole.

In the vehicle back door device according to the first aspect, a back door is supported such that it is able to open and close at a vehicle main body, and a damper is provided such that it is able to extend and retract between the vehicle main body and the back door. One end portion in the extension/retraction direction of the damper (hereinafter, referred to simply as 'the one end portion of the damper') is mounted to a bracket that is fixed to the vehicle main body, and another end portion in the extension/retraction direction of the damper (hereinafter referred to simply as 'the other end portion of the damper') is mounted to the back door. Urging force that urges the back door in a direction in which it opens is dampened by this damper.

The bracket that is fixed to the vehicle main body is formed so as include a supporting portion and a positioning portion. The supporting portion supports the one end portion of the damper and is former so as to include a supporting wall and a pin. The supporting wall is disposed along a vehicle front-rear direction and also a vehicle up-down direction, and a pin whose axial direction extends in the vehicle transverse direction is provided at the supporting wall. In contrast, an abutting portion provided in the one end portion of the damper abuts against the positioning portion.

Here, a first distance in the vehicle up-down direction between an upper end surface of the positioning portion and an axial center of the pin is set so as to be equal to a second distance in the vehicle up-down direction between a lower surface of the abutting portion provided in the one end portion of the damper and a hole center of an insertion hole provided in this abutting portion. Furthermore, a third distance in the vehicle front-rear direction between a rear end surface of the positioning portion and an axial center of the pin is set so as to be equal to a fourth distance in the vehicle front-rear direction between a front surface of the abutting portion and the hole center of the insertion hole.

In other words, in the present disclosure, when the lower surface and front surface of the abutting portion provided in the one end portion of the damper abut respectively against the upper end surface and rear end surface of the positioning portion of the bracket the insertion hole in the damper is located coaxially with the pin of the bracket. On the other hand, the supporting wall and the positioning portion are formed facing each other in the vehicle transverse direction. Accordingly, in a case in which the abutting portion of the damper is abutting against the positioning portion of the bracket, if the one end portion of the damper is then moved in the vehicle transverse direction so that the pin on the bracket is inserted into the insertion hole in the damper, the one end portion of the damper becomes rotatably supported by the supporting wall.

For example, in the case of a ball joint mechanism, since the ball socket must be externally fitted to the ball stud, sufficient force to press the ball socket to the ball stud is required. However, in the present disclosure, since the one end portion of the damper can be supported by the supporting portion simply by causing the abutting portion of the damper to abut against the positioning portion of the bracket so that the pin of the bracket is inserted into the insertion hole in the damper, the aforementioned level of force is not required. Accordingly, there is no need for an operator to be in close proximity to the supporting portion, and while grasping the other end portion of the damper the operator is able to cause the one end portion of the damper to be supported by the supporting portion at the vehicle main body side.

Accordingly, even in a case in which the supporting portion is provided deep in the interior of the luggage space, an operator may easily cause the one end portion of the damper to be supported by the supporting portion without having to adopt an impossible posture such as being forced to overreach or the like. As a result, in the first aspect of the present disclosure, workability when mounting the damper may be improved and the work time may be shortened.

A second aspect of the present disclosure is a vehicle back door device including: a back door supported such that the back door is able to open and close at a vehicle main body; and a damper provided such that the damper is able to extend and retract between the vehicle main body and the back door, the damper including one end portion in an extension/retraction direction mounted to the vehicle main body via a bracket fixed to the vehicle main body and another end portion in the extension/retraction direction mounted to the back door, and the damper dampening urging force that urges the back door in a direction in which the back door opens, the bracket comprising: a supporting portion that supports the one end portion in the extension/retraction direction of the damper; and a positioning portion formed facing the supporting portion in a vehicle transverse direction, the positioning portion being abutted against by an abutting portion provided at the one end portion in the extension/retraction direction of the damper, the supporting portion including: a supporting wall disposed along a vehicle front-rear direction and a vehicle up-down direction; and a pin provided at the supporting wall, an axial direction of the pin extending in the vehicle transverse direction, a fifth distance in the vehicle up-down direction between a lower end surface of the positioning portion and an axial center of the pin being set to be equal to a sixth distance in the vehicle up-down direction between an upper surface of the abutting portion and a hole center of an insertion hole provided in the abutting portion, and a seventh distance in the vehicle front-rear direction between a rear end surface of the portioning portion and an axial center of the pin being set to be equal to an eighth distance in the vehicle front-rear direction between a front surface of the abutting portion and the hole center of the insertion hole.

In the back door device for a vehicle according to the second aspect, in the same way as in the first aspect, one end portion of the damper that is provided between the vehicle main body, and the back door is mounted to a bracket that is fixed to the vehicle main body. This bracket is formed so as to include a supporting portion and a positioning portion, and the supporting portion supports the one end of the damper, while the abutting portion that is provided at the one end of the damper abuts against the positioning portion.

Here, a fifth distance in the vehicle up-down direction between a lower end surface of the positioning portion and an axial center of the pin is set so as to be equal to a sixth distance in the vehicle up-down direction between an upper surface of the abutting portion that is provided at the one end portion of the damper and a hole center of an insertion hole provided in the abutting portion. Moreover, a seventh distance in the vehicle front-rear direction between a rear end surface of the positioning portion and an axial center of the pin is set so as to be equal to an eighth distance in the vehicle front-rear direction between a front surface of the abutting portion and the hole censer of the insertion hole.

In other words, in the present disclosure, in a case in which the upper surface and front surface of the abutting portion provided in the one end portion of the damper abut respectively against the lower end surface and rear end surface of the positioning portion of the bracket, the insertion hole in the damper is located coaxially with the pin of the bracket. On the other hand, the supporting wall and the positioning portion are formed facing each other in the vehicle transvers direction. Accordingly, while the abutting portion of the damper is abutting against the positioning portion of the bracket in a case in which the one end portion of the damper is then moved in the vehicle transverse direction so that the pin of the bracket is inserted into the insertion hole in the damper, the one end portion of the damper becomes rotatably supported by the supporting portion.

In a third aspect of the present disclosure, in the above-described aspects, the other end portion the extension/retraction direction of the damper may be mounted to the back door at an upper side in the vehicle up-down direction of the position of the pin; and a facing wall facing the supporting portion in the vehicle transverse direction, and, when the other end portion in the extension retraction direction of the damper is mounted to the back door may be provided at the bracket, the facing wall may overlap with the one end portion in the extension/retraction direction of the damper when seen in a vehicle side view.

In the vehicle back door device according to the third aspect, the other end portion of the damper is mounted to the back door at an upper side in the vehicle up-down direction (hereinafter, this will be referred to simply as 'the upper side') of the position of the pin. In addition, a facing wall that faces the supporting portion in the vehicle transverse direction is provided at the bracket, and when the other end portion of the damper is mounted to the back door, this facing wall overlaps with the one end portion of the damper when seen in a vehicle side view.

Here, the one end portion of the damper is mounted to the vehicle main body, and the other end portion of the damper is mounted to the back door. Its addition, a pin is provided at a supporting wall of the bracket, and this pin is able to be inserted into an insertion hole that is formed in the one end portion of the damper. In the present disclosure, since the other end portion of the damper is mounted to the back door at the upper side of the position of the pin, when the pin has been inserted into the insertion hole provided in the one end portion side of the damper, the other end portion of the damper is able to pivot around this pin in the vehicle front-rear direction and the vehicle up-down direction.

Moreover, in the present disclosure a facing wall is provided at the bracket, and when the other end portion of the damper has been mounted to the back door, this facing wall overlaps with the one end portion of the damper when seen in a vehicle side view. Accordingly, when the other end portion of the damper has been mounted to the back door, movement of the one end portion of the damper in the vehicle transverse direction is restricted by this facing wall of the bracket, and a state in which the pin remains inserted in the insertion hole can be maintained (in what is known as a locked state).

Since the angle of the damper, in a case in which the one end portion of the damper is mounted to the vehicle main body, is different from the angle of the damper when the other end portion of the damper is mounted to the back door, by using this to make the facing wall overlap with the one end portion of the damper when seen in a vehicle side view after the other end portion of the damper has been mounted to the back door, a locking mechanism may easily be achieved.

In a fourth aspect of the present disclosure, in the above-described third aspect, the positioning portion may be provided at the facing wall, and the abutting portion may be capable of overlapping with the facing wall when seen in a vehicle side view.

In the vehicle back door device according to the fourth aspect, the positioning portion is provided at the facing wall, and the abutting portion is capable of overlapping with the facing wall when seen in a vehicle side view. In other words, the facing wall is provided with two functions, namely, a function of positioning the one end portion of the damper in the vehicle up-down direction and the vehicle front-rear direction relative to the bracket, and a function of locking the one end portion of the damper in the vehicle transvers direction. Meanwhile, the abutting portion provided at the one end portion the damper is also provided with two function, namely, a function of positioning the facing wall in the vehicle up-down direction and the vehicle front-rear direction relative to the bracket, and a function of locking the facing wall in the vehicle transverse direction.

In this way, by providing a single portion with a plurality of functions, the configuration of each component can be simplified compared to when separate portions are formed respectively in order to perform each individual function.

In a fifth aspect of the present disclosure, in the above-described first aspect, the positioning portion may include: a bracket-side vertical surface, disposed at the bracket, and extending in the vehicle up-down direction and the vehicle transverse direction, the bracket-side vertical surface being used to position the bracket in the vehicle front-rear direction; and a bracket-side horizontal surface, joined to the bracket-side vertical surface, and disposed at the bracket extending in the vehicle front-rear direction and the vehicle transverse direction, the bracket-side horizontal surface being used to position the bracket in the vehicle up-down direction, and the abutting portion may include: a damper-side vertical surface provided in such a way that the damper-side vertical surface is capable of abutting against the bracket-side vertical surface from a rearward side in the vehicle front-rear direction of the bracket-side vertical surface; and a damper-side horizontal surface provided in such a way that the damper-side horizontal surface is capable of abutting against the bracket-side horizontal surface from an upper side in the vehicle up-down direction of the bracket-side horizontal surface.

In the vehicle back door device according to the fifth aspect, the positioning portion is formed to include a bracket-side vertical surface and a bracket-side horizontal surface. The bracket-side vertical surface is disposed at the bracket so as to extend in the vehicle up-down direction and the vehicle transverse direction, and is used to position the bracket in the vehicle front-rear direction. The bracket-side horizontal surface is disposed at the bracket so as to extend the vehicle front-rear direction and the vehicle transverse direction, and is used to position the bracket in the vehicle up-down direction.

In contrast, the abutting portion is formed so as to include a damper-side vertical surface and a damper-side horizontal surface. The damper-side vertical surface is provided such that it is capable of abutting against the bracket-side vertical surface from the rearward side in the vehicle front-rear direction (hereinafter, this will be referred to simply as the 'rearward side') of the bracket-side vertical surface. The damper side horizontal surface is provided such that it is capable of abutting against the bracket-side horizontal surface from the upper side of the bracket-side horizontal surface.

Namely, the abutting portion can be abutted against the bracket-side vertical surface and the bracket-side horizontal surface from the rearward side and the upper side. As a result, this abutting portion can be positioned in the vehicle front-rear direction and the vehicle up-down direction relative to the bracket.

In a sixth aspect of the present disclosure, in the above-described second aspect, the positioning portion may include: a bracket-side vertical surface, disposed at the bracket, and extending in the vehicle up-down direction and the vehicle transverse direction, the bracket-side vertical surface being used to position the bracket in the vehicle front-rear direction; and a bracket-side horizontal surface, joined to the bracket-side vertical surface, and disposed at the bracket extending in the vehicle front-rear direction and the vehicle transverse direction, the bracket-side horizontal surface being used to position the bracket in the vehicle up-down direction, and the abutting portion may include: a damper-side vertical surface provided in such a way that the damper-side vertical surface is capable of abutting against the bracket-side vertical surface from a rearward side in the vehicle front-rear direction of the bracket-side vertical surface; and a damper-side horizontal surface provided in such a way that the damper-side horizontal surface is capable of abutting against the bracket-side horizontal surface from a lower side in the vehicle up-down direction of the bracket-side horizontal surface.

In the vehicle back door device according to the sixth aspect, the positioning portion is formed to include a bracket-side vertical surface and a bracket-side horizontal surface. The bracket-side vertical surface is disposed at the bracket so as to extend in the vehicle up-down front-rear direction. The bracket-side horizontal surface is disposed at the bracket so as to extend in the vehicle front-rear direction and the vehicle transverse direction, and is used to position the bracket in the vehicle up-down direction.

In contrast, the abutting portion is formed to include a damper-side vertical surface and a damper-side horizontal surface. The damper-side vertical surface is provided so as to be capable of abutting against the bracket-side vertical surface from the rearward side of the bracket-side vertical surface. The damper side horizontal surface is provided so as to be capable of abutting against the bracket-side horizontal surface from the lower side in the vehicle up-down direction (here-after, this will be referred to simply as the 'lower side') of the bracket-side horizontal surface.

Namely, the abutting portion can be abutted against the bucket-side vertical surface and the bracket-side horizontal surface from the rearward side and the lower side. As a result, this abutting portion can be positioned in the vehicle front-rear direction and the vehicle up-down direction relative to the bracket.

As has been described above, according to the vehicle back door device of the first and second aspects, workability when mounting a damper may be improved.

According to the vehicle back door device of the third aspect, in a case in which another end portion of a damper is mounted to a back door, one end portion of the damper may be locked in place via an abutting portion.

According to the vehicle back door device of the fourth aspect, by providing a single portion with a plurality of functions, the configuration of each component may be simplified compared to a case in which separate portions are formed respectively in order in perform each individual function.

According to the vehicle back door device of the fifth aspect, by positioning the abutting portion relative to the positioning portion of the bracket from the rearward side and the upper side, any interference with components located at the rearward side and the lower side of the bracket may be avoided.

According to the vehicle back door device of the sixth aspect, by positioning the abutting portion relative to the positioning portion of the bracket from the rearward side and the lower side, any interference with components located at the rearward side and the upper side of the bracket may be avoided.

BRIEF DESCRIPTION OF THE DRAWINGS

Exemplary embodiments will be described in detail based on the following figures, wherein.

DETAILED DESCRIPTION

Figure 1:
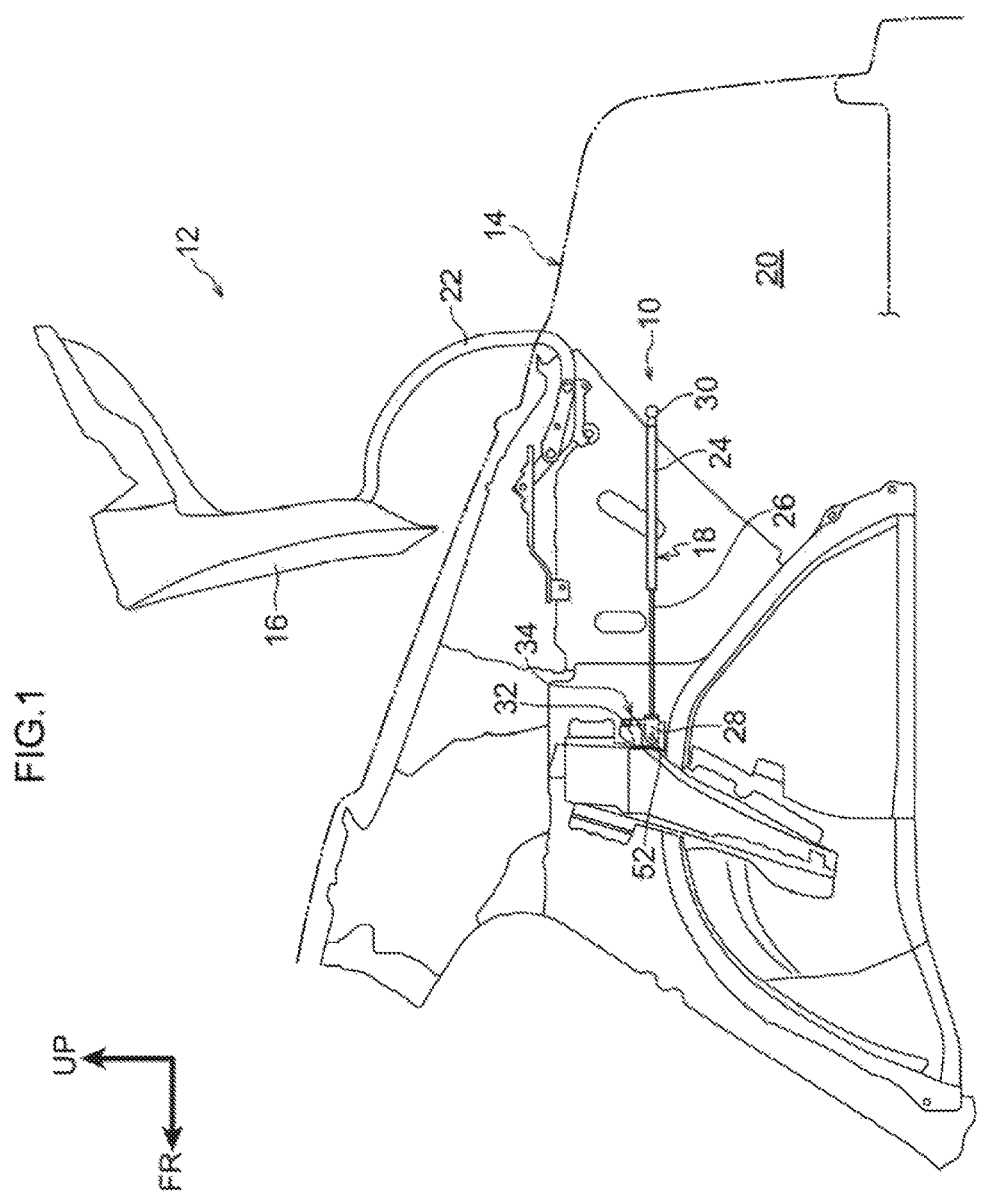
FIG. 1 is a side view illustrating a state in which, in a vehicle back door device according to the present exemplary embodiment, a vehicle body-side mounting portion of damper is mounted to a vehicle main body.

Hereinafter, a vehicle back door device according to the present exemplary embodiment will be described using the drawings. Note that, an arrow FR, an arrow UP, and an arrow OUT illustrated in the drawings respectively indicate a vehicle front side, a vehicle upper side, and an outer side in a vehicle transverse direction of an automobile (i.e., a vehicle) 12 in which a vehicle back door device 10 has been fitted. Furthermore, hereinafter, unless specifically stated, front-rear, up-down, or left-right directions refer respectively to the front-rear direction of the vehicle, the up-down direction of the vehicle, and the left-right direction of the vehicle (i.e., the vehicle transverse direction).

(Structure of a Vehicle Back Door Device)

Firstly, the structure of the vehicle back door device 10 according to the present exemplary embodiment will be described.

Figure 2:
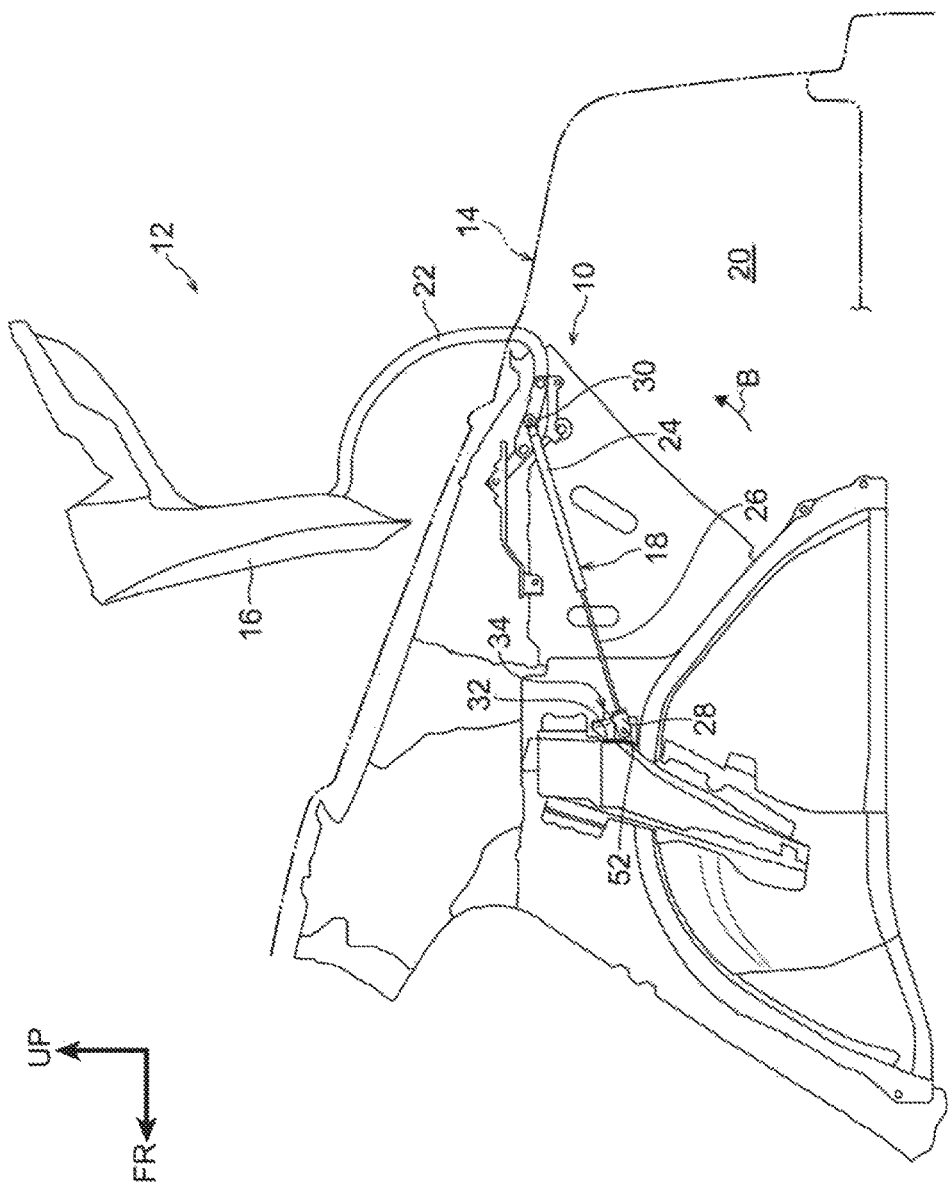
FIG. 2 is a side view illustrating a state in which, in the vehicle back door device according to the present exemplary embodiment, a back door-side mounting portion of the damper is mounted to a hinge arm.
Figure 3:
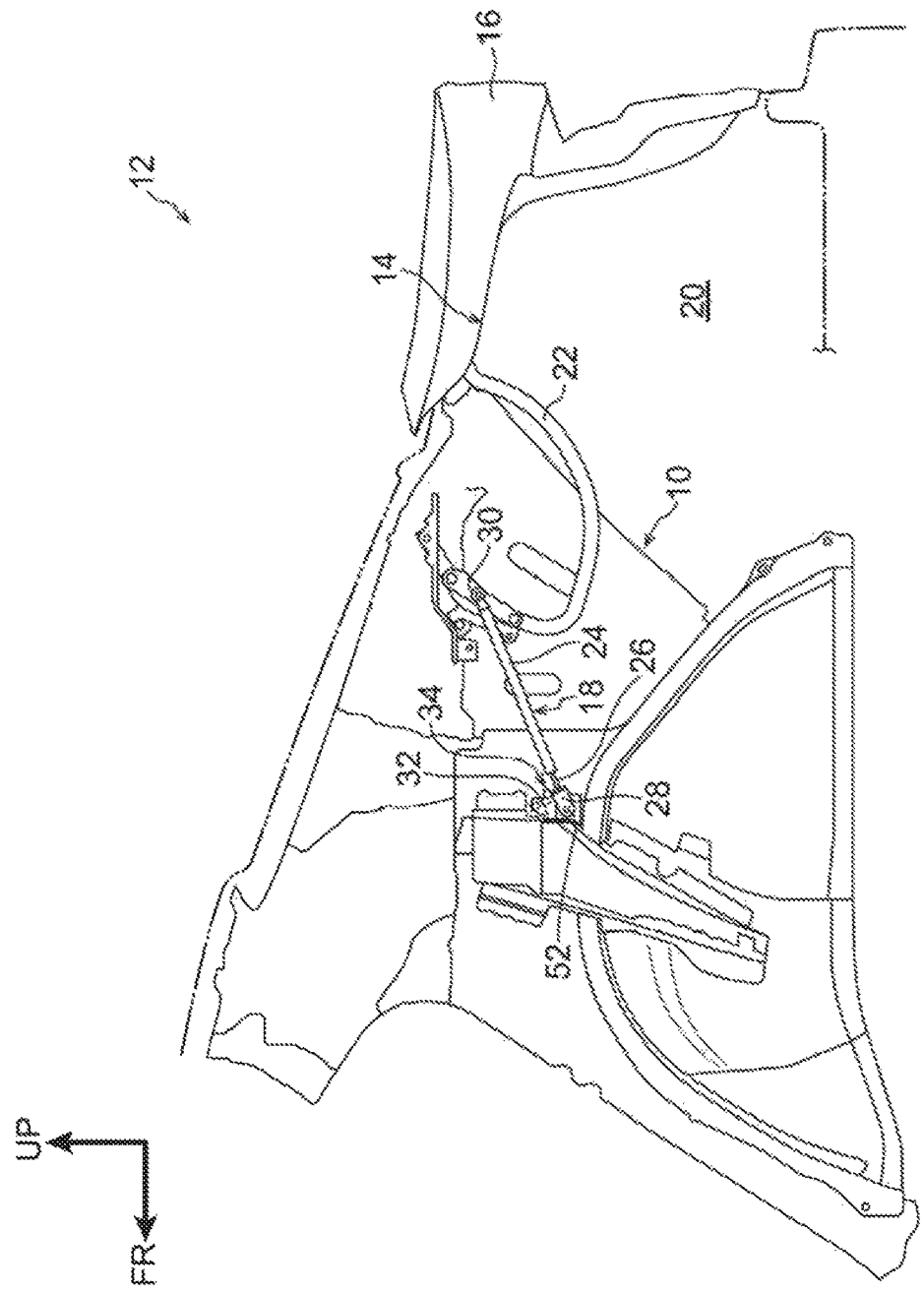
FIG. 3 is a side view illustrating a state in which, in the vehicle back door device according to the present exemplary embodiment, the back door is closed with the damper having been mounted to the vehicle main body and the hinge arm.

As illustrated in FIG. 2 and FIG 3. the vehicle back door device 10 according to the present exemplary embodiment includes a back door 16 that is provided such that it is able to open and close at a rear portion of a vehicle main body 14, and a damper 18 that is provided between the vehicle main body 14 and the damper 16 such that the damper 18 is able to expand and retract.

The back door 16 is able to open and close a luggage space 20 that is provide in a rear portion of the vehicle main body 14, and the back door 16 and the vehicle main body 14 are joined together by hinge arms 22. As illustrated in FIG. 3, when the back door 16 is closed against the vehicle main body 14, the hinge arms 22 form a substantially U-shape that is open in an upward direction when seen in a vehicle side view, and one hinge arm 22 is provided respectively at the left and right sides of the luggage space 20.

Moreover, one end portion in an axial direction of a compression coil spring (not illustrated in the drawings) is attached to the hinge arm 22. Another end portion in the axial direction of this compression coil spring is attached to the vehicle main body 14. This compression coil spring is compressed when the back door 16 is moved in a direction in which the back door 16 is closed against the vehicle main body 14, and the urging force of the compression coil spring is set at maximum when the back door 16 is in a closed state.

Generally, a locking mechanism (not illustrated in the drawings) is provided in the vehicle main body 14 and the back door 16. A state in which the back door 16 is locked against the vehicle main body 14 is maintained when this locking mechanism is in a locked state. When the locked state provided by this locking mechanism is released, the back door 16 can be opened up from the vehicle main body 14.

As described above, since the urging force of the compression coil spring is at maximum when the back door 16 is closed against the vehicle main body 14, when the back door 16 is opened, the back door 16 is urged in the opening direction by the elastic restoring force of the compression coil. Due to the above, in the present exemplary embodiment, the damper 18 is interposed between the vehicle main body 14 and the back door 16, and the urging force from the compression coil spring is dampened by this damper 18.

Note that, here, a compression coil spring is used, however, the present invention is not limited to this provided that some structure that is able to urge the back door 16 in the opening direction is employed. For example, it is also possible to employ a tension coil spring or a torsion spring. The damper 18 is a piston type of damper and, in the present exemplary embodiment, is provided at the right side of the vehicle main body 14. However, the damper 18 may instead be provided at the left side of the vehicle main body 14, or alternatively a damper 18 may be provided at both the left and right sides of the vehicle main body 14.

Here, the damper 18 that forms a portion of the vehicle back door device 10 according to the present exemplary embodiment will be described.

As illustrated in FIG. 2 and FIG. 3, the damper 18 is formed so as to include a cylinder-shaped cylinder 24, and a rod 26 that moves in and out of the cylinder 24. A piston (not illustrated in the drawings) is provided at the rod 26 inside the cylinder 24, and this piston is able to move inside the cylinder 24 in conjunction with the movement of the rod 26.

Note that the interior of the cylinder 24 is filled, for example, with oil such as silicon oil or the like (forming what is know as an oil damper), and in a case in which the piston is moved inside the cylinder 24 via the rod 26, a load is imparted to the rod 26 via the piston by viscous resistance from the oil inside the cylinder 24.

Moreover, in the present exemplary embodiment, the rod 26 is made to protrude from the cylinder 24 such that load is imparted to the rod 26, and such that the load to the piston is at the minimum in a case in which the rod 26 is housed inside the cylinder 24. Furthermore, in the present exemplary embodiment, what is know as an 'oil damper' is used for the damper 18. However, the present invention is not limited to this, and it is also possible to use, for example, a gas damper.

Moreover, in the present exemplary embodiment, a vehicle body-side mounting portion 28 (described below) that is mounted to the vehicle main body 14 is provided at one end portion in the extension/retraction direction of the damper 18. A back door-side mounting portion 30 that is mounted to the hinge arm 22 of the back door 16 is provided at another end portion in the extension/retraction direction of the damper 18.

Due to the above, when the back door 16 is opened, the cylinder 24 is moved in a direction in which the rod 26 is made to protrude from the cylinder 24 via the hinge arm 22. As a consequence, a load is applied to the rode 26, and a damping effect is obtained from the damper 18 when the back door 16 is opened.

Figure 4:
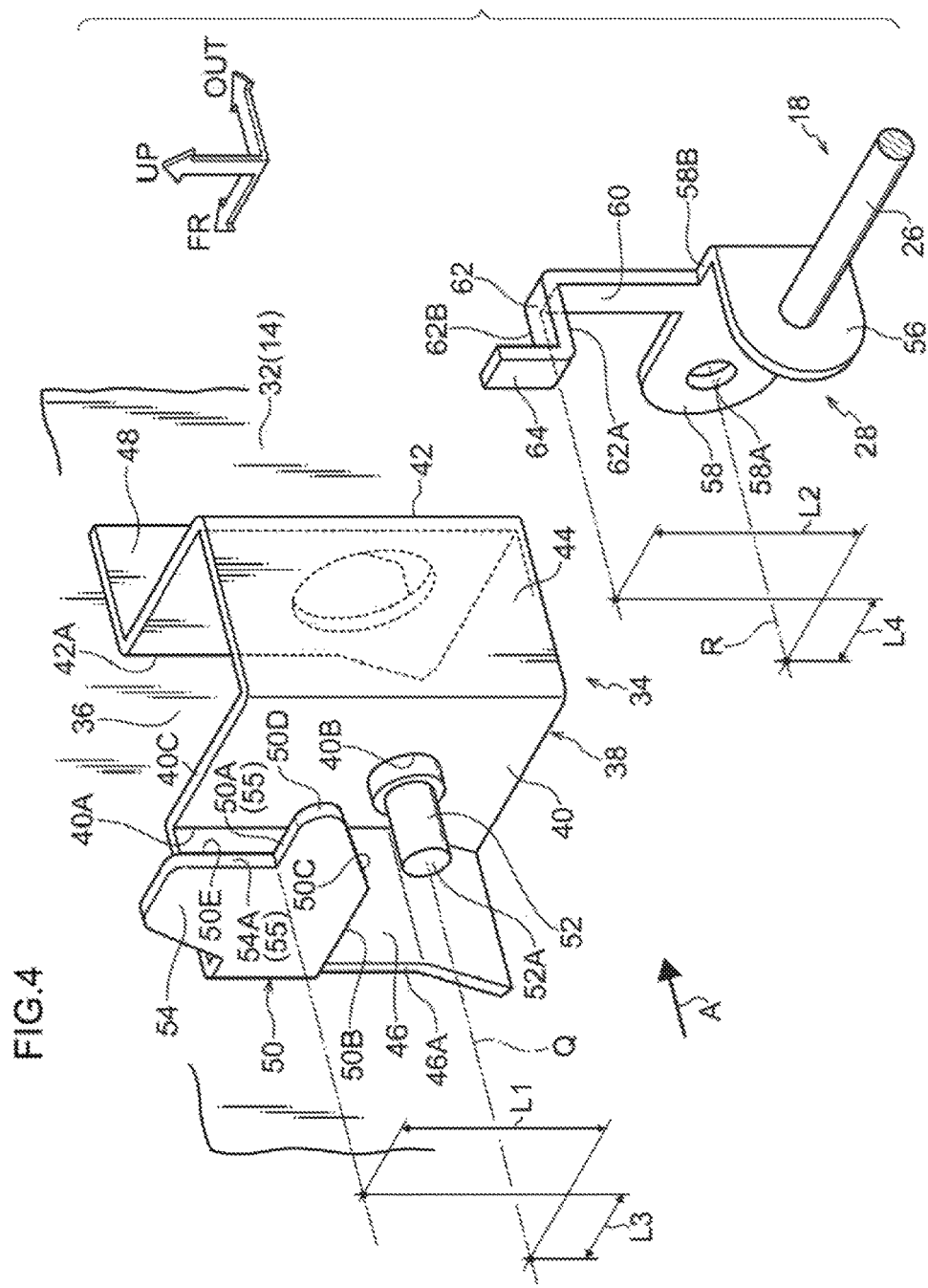
FIG. 4 is a perspective view as seen from a direction diagonally to the left and rear of a vehicle illustrating a vehicle main body-side bracket and the vehicle body-side mounting portion of the damper in the vehicle back door device according to the present exemplary embodiment.
Figure 5:
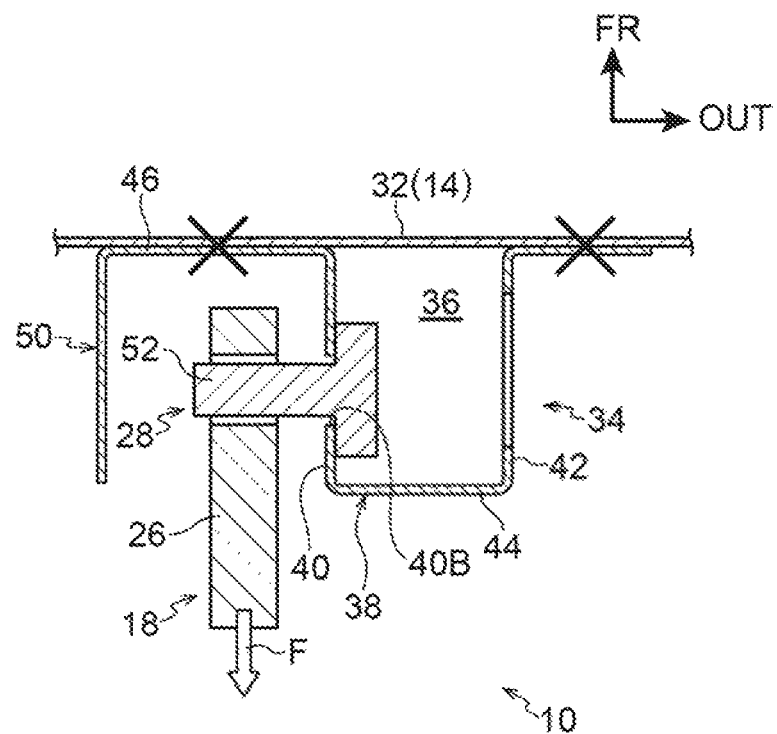
FIG. 5 is a planar cross-sectional view that has been schematized in order to illustrate an action of the vehicle back door device according to the present exemplary embodiment.

Next, principal portions of the vehicle back door device 10 according the present exemplary embodiment will be described. As illustrated in FIG. 1 and FIG. 4, in the present exemplary embodiment, a bracket 34 that is used to mount the vehicle body-side mounting portion 28 of the damper 18 is provided at a panel 32 at the vehicle main body 14 side. This bracket 34 is formed, for example, from a steel plate or the like, and is joined to the vehicle main body 14 by welding or the like.

As illustrated in FIG. 4, when seen in a plan view, the bracket 34 is formed in a hat shape that is open towards the front side. Further, the bracket 34 is formed such that it forms a closed cross-sectional portion 36 together with the panel 32 at the vehicle main body 14 side. More specifically, a wall portion 38 that forms the closed cross-sectional portion 36 together with the panel 32 is provided at the bracket 34. The wall portion 38 is formed including: an inner wall portion (hereinafter, referred to as a supporting wall) 40 that serves as a supporting wall and is positioned at the inner side in the vehicle transverse direction of the luggage space 20 (see FIG. 6); an outer wall portion 42 that is positioned at the outer side in the vehicle transverse direction of the luggage space 20; and a rear wall portion 44 that is positioned at the rearward side.

Furthermore, a joining piece 46 of the closed cross-sectional portion 36 that is bent towards the inner side in the vehicle transverse direction extends from a front end 40A of the supporting wall 40, and a joining piece 48 of the closed cross-sectional portion 36 that is bent towards the outer side in the vehicle transvers direction extends from a front end 42A of the outer wall portion 42. The joining pieces 46 and 48 are formed such that they conform to the shape of the panel 32 at the vehicle main body 14 side. The joining pieces 46 and 48 are joined to the panel 32 at the vehicle main body 14 side.

In this way, as a result of the joining pieces 46 and 48 being joined to the panel 32 at the vehicle main body 14 side, the closed cross-sectional portion 36 is formed between the panel 32, and the wall portion 38 of the bracket 34. As a consequence, compared with a case in which no closed cross-sectional portion is formed may be suppressed.

In addition, a facing wall 50, that is bent towards the rearward side and faces the supporting wall 40 in the vehicle transverse direction, is provided at an upper portion of a side end 46A of the joining piece 46 of the bracket 34. In contrast, a fixing hole 40B is provided in the supporting wall 40 of the bracket 34 in a position at the supporting wall 40 that is below a center portion in the up-down direction. A pin 52 is fixed in this fixing hole 40B.

The pin 52 is provided extending in the vehicle transverse direction in the bracket 34, and the vehicle body-side mounting portion 28 of the damper 18 is mounted to (i.e., is supported by) the pin 52 (described below). Note that, in a side view as seen from a direction indicated by an arrow A (i.e., in a vehicle side view), the facing wall 50 is formed such that it does not overlap with the pin 52 fixed in the supporting wall 40.

The facing wall 50 is formed substantially in an L-shape when seen in a side view from the direction of the arrow A, and an upper portion 54 of the facing wall 50 is formed so as to bulge upwards from an upper end 40C of the supporting wall 40. A positioning portion 55 is provided in a rear portion of the facing wall 50. The positioning portion 55 is formed by a rear end surface (i.e., a bracket-side vertical surface) 54A of the bracket 34 that extends (i.e., is disposed) in the vehicle up-down direction and in the vehicle transverse direction, and an upper end surface (i.e., a bracket-side horizontal surface) 50A of the bracket 34 that extends (i.e., is disposed) in the vehicle front-rear direction and the vehicle transverse direction.

Namely, the position in the vehicle front-rear direction of the bracket 34 is determined by the rear end surface 54A of the facing wall 50, and the position in the vehicle up-down direction of the bracket 34 is determined by the upper end surface 50A of the facing wall 50. Note that the rear end surface 54A and the upper end surface 50A of the facing wall 50 are formed continuously with each other, and are formed substantially in an L-shape when seen in a side view from the direction of the arrow A.

Moreover a lower end surface which is substantially parallel with the upper end surface 50A, formed at the underside of the upper end surface 50A of the facing wall 50, and a sloping surface 50C that slopes upwards as approaches the rearward side is formed in a rear portion of the lower end surface 50B. A rear end surface 50D of the facing wall 50 is formed as a rounded corner between the upper wall surface and the sloping surface 50C of the facing wall 50.

In contrast the vehicle body-side mounting portion 28 of the damper 18 is provided at one end portion in the longitudinal direction of the rod 26. The vehicle body-side mounting portion 28 is provided with a fixing piece and an engaging piece that are formed substantially in an L-shape when seen in a plan view. The fixing piece 56 is fixed to the rod 26 so as to be substantially orthogonal so the axis of the rod 26, while the engaging piece 58 is formed so as to be substantially parallel with the axis of the rod 26. Namely, when the damper 18 is mounted to the vehicle main body 14, the fixing piece 56 is disposed so as to extend in the vehicle up-down direction and the vehicle transverse direction, while the engaging piece 58 is disposed so as to extend in the vehicle front-rear direction and the vehicle up-down direction.

An insertion hole 58A is formed in a central portion in the up-down direction of a distal end side of the engaging piece 58, and the pin 52 that is fixed to the bracket 34 side is able to be inserted into this insertion hole 58A. An extended piece 60 extends upwards from the fixed piece 56 side at an upper end 58B of the engaging piece 58. An abutting piece 62 is provided at a distal end portion of this extended piece 60. The abutting piece 62 extends substantially horizontally from a distal end of the extending piece 60 in parallel with the fixed piece 56, and a restricting piece 64 that is bent upwards so as to be parallel with the extended piece 60 extends from a distal end of the abutting piece 62. A bottom surface (i.e., a damper-side horizontal surface) 62A of the abutting piece 62 is able to abut against the upper end surface 50A of the positioning portion 55 (i.e., the facing wall 50). Moreover, a front surface (i.e., a damper-side vertical surface) 62B of the abutting piece 62 is able to abut against the rear end surface 54A of the positioning portion 55.

Here, as illustrated in FIG. 4, in the present exemplary embodiment, a distance L1 (i.e., a first distance), which is a distance between the upper end surface 50A of the positioning portion 55 and an axial center Q of the pin 52 at the bracket 34 side in the vehicle up-down direction, is set so as to be the same as a distance L2 (i.e., a second distance), which is a distance between the bottom surface 62A of the abutting piece 62 and a hole center R of the insertion hole 58A of the damper 18 in the vehicle up-down direction. Furthermore, a distance L3 (i.e., a third distance), which is a distance between the rear end surface 54A of the positioning portion 55 and the axial center Q of the pin 52 in the vehicle front-rear direction, is set so as to be the same as a distance L4 (i.e., a fourth distance), which is a distance between the front surface 62B of the abutting piece 62 and the hole center R of the insertion hole 58A in the vehicle front-rear direction.

Figure 7A:
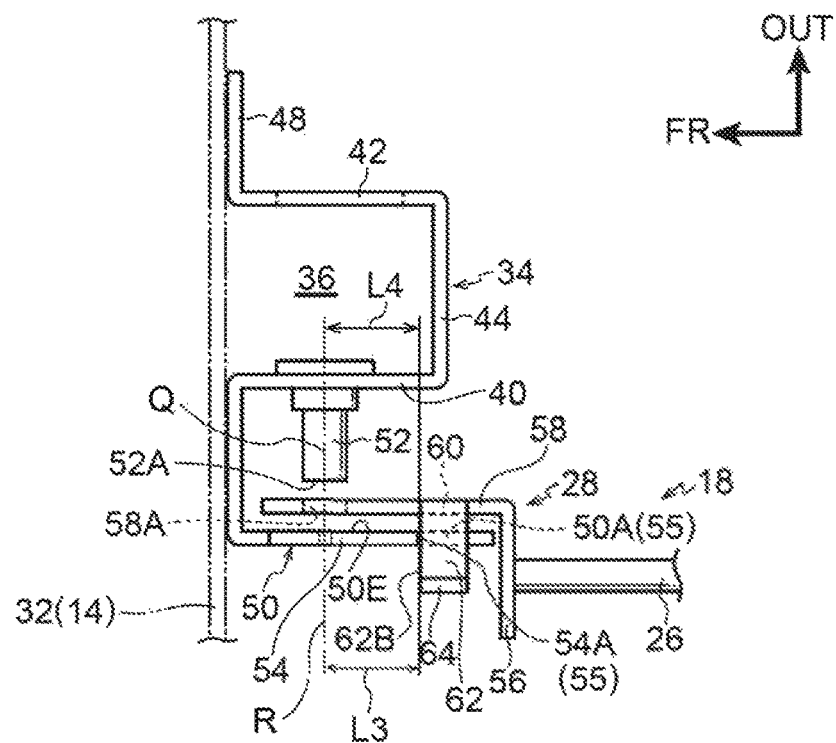
FIG. 7A is a plan view of the vehicle main body-side bracket and the vehicle body-side mounting portion of the damper illustrating a state in which the vehicle body-side mounting portion of the damper has been positioned relative to the bracket in the vehicle back door device according to the present exemplary embodiment.
Figure 7B:
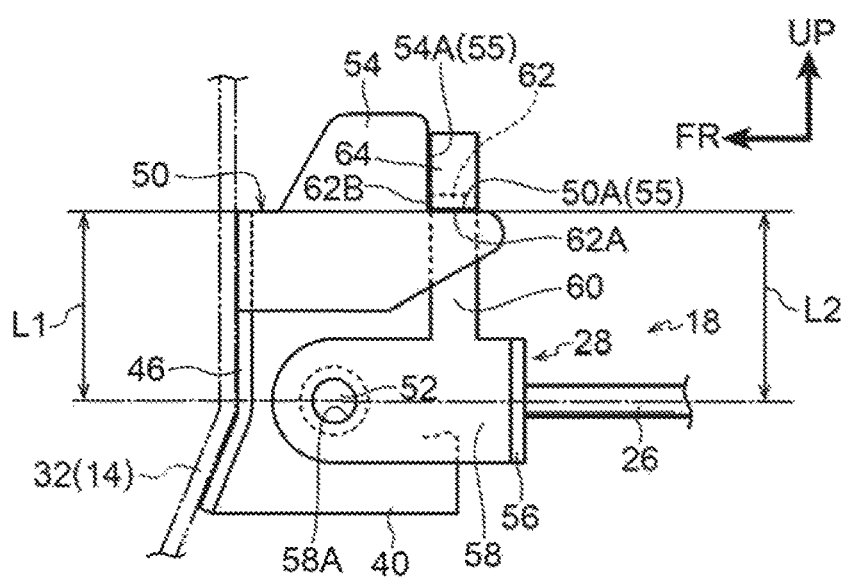
FIG. 7B is a side view corresponding to FIG. 7A.

Accordingly, in the present exemplary embodiment, in a case in which the bottom surface 62A of the abutting piece 62 at the damper 18 side is abutted against the upper end surface 50A of the facing wall 50 at the bracket 34 side, and the front surface 62B of the abutting piece 62 is abutted against the rear end surface 54A of the facing wall 50, then as illustrated in FIG. 7A and FIG. 7B, the vehicle body-side mounting portion 28 of the damper 18 is positioned in the vehicle up-down direction and the vehicle front-rear direction relative to the bracket 34. Note that, at this time, it is also possible for the extended piece 60 to abut against an internal surface 50E of the facing wall 50. In this case, the vehicle body-side mounting portion 28 of the damper 18 is further positioned in the vehicle transverse direction of the bracket 34.

When the vehicle body-side mounting portion 28 of the damper 18 has been positioned in the vehicle up-down direction and the vehicle front-rear direction relative to the bracket 34, the insertion hole 58A of the engaging piece 58 which forms a portion of the vehicle body-side mounting portion 28 is disposed coaxially with the pin 52 of the supporting wall 40 of the bracket 34. Note that a plan view illustrating the vehicle body-side mounting portion 28 of the damper 18 and the bracket 34 is illustrated in FIG. 7A, while a side view corresponding to FIG. 7A is illustrated in FIG. 7B. FIG. 8A through FIG. 9B described below are the same as FIG. 7A and FIG. 7B.

Next a method of mounting the damper 18 that forms a portion of the vehicle back door device 10 according to the present exemplary embodiment will be described.

Figure 6:
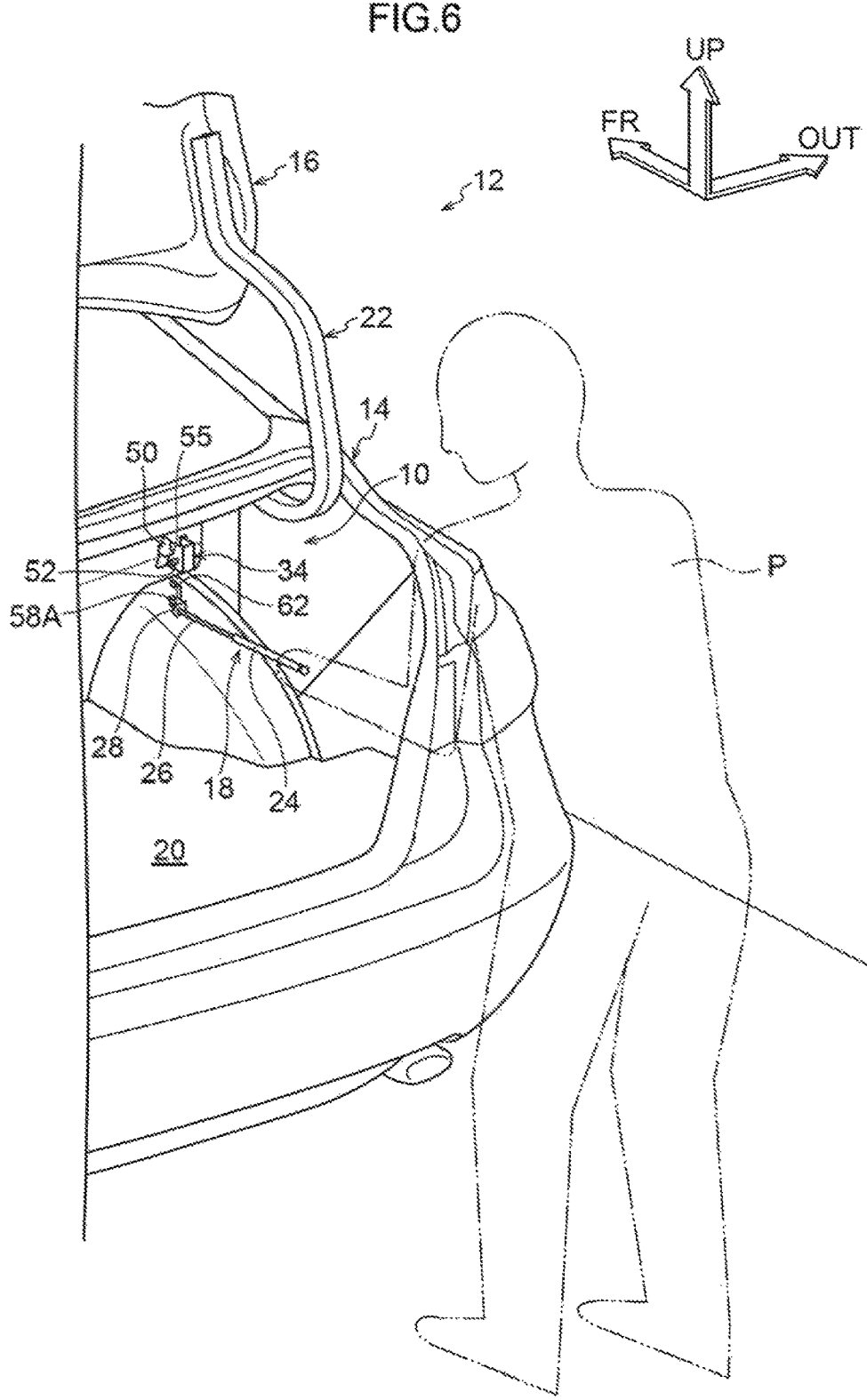
FIG. 6 is a perspective view as seen from a direction diagonally to the left and rear of a vehicle illustrating a task of mounting a vehicle body-side mounting portion of a damper to a vehicle main body being performed for the vehicle back door device according to the present exemplary embodiment.

As illustrated in FIG. 1 and FIG. 6, when the back door 16 is open, the rod 26 of the damper 18 is made to protrude from the cylinder 24, and while holding the cylinder 24 side of the damper 18, the vehicle body-side mounting portion 28 is brought closer to the facing wall 50 side of the bracket 34. Next, as illustrated in FIG. 4, FIG. 7A and FIG. 7B, the abutting piece 62 of the vehicle body-side mounting portion 28 of the damper 18 is structured to abut against the positioning portion 55 of the facing wall 50 of the bracket 34.

More specifically, firstly, as illustrated in FIG. 4 and FIG. 7A, the engaging piece 58 forming the vehicle body-side mounting portion 28 of the damper 18 is inserted in the vehicle traverse direction between the internal surface 50E of the facing wall 50 of the bracket 34 and the distal end surface 52A of the pin 52 that is fixed in the supporting wall 40.

At this time, as described above, the bottom surface 62A of the abutting piece 62 forming a portion of the vehicle body-side mounting portion 28 of the damper 18 abuts against the upper end surface 50A of the positioning portion 55 of the bracket 34 illustrated in FIG. 4, FIG. 7A and FIG. 7B, and the front surface 62B of the abutting piece 62 of the vehicle body-side mounting portion 28 of the damper 18 abuts against the rear end surface 54A of the positioning portion 55. As a consequence, the hole center R of the insertion hole 58A in the damper 18 is disposed coaxially with the axial center Q of the pin 52 of the bracket 34.

Figure 8A:
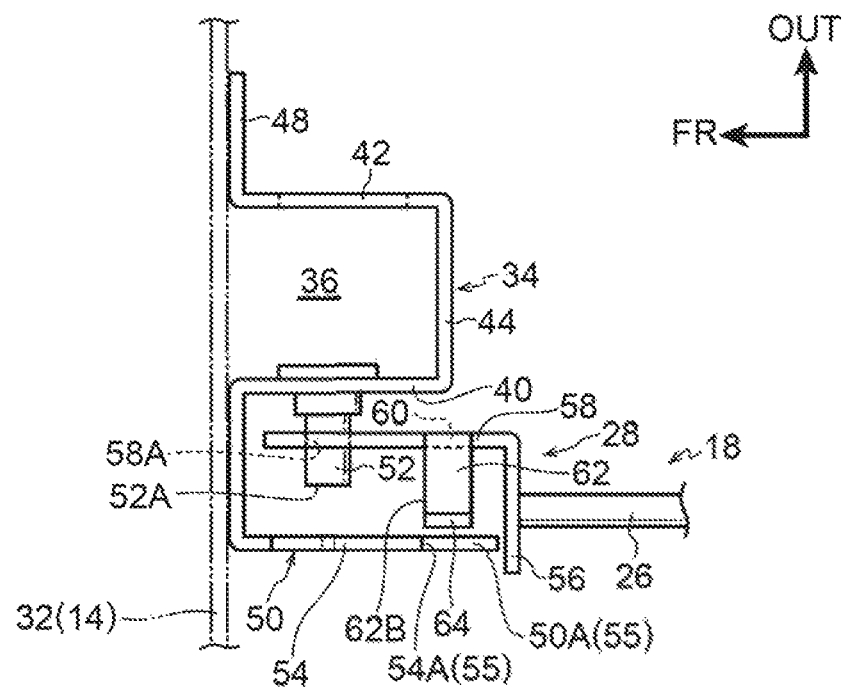
FIG. 8A is a plan view of the vehicle main body-side bracket and the vehicle body-side mounting portion of the damper illustrating a state in which the vehicle body-side mounting portion of the damper has been engaged with a vehicle main body-side pin in the vehicle back door device according to the present exemplary embodiment.
Figure 8B:
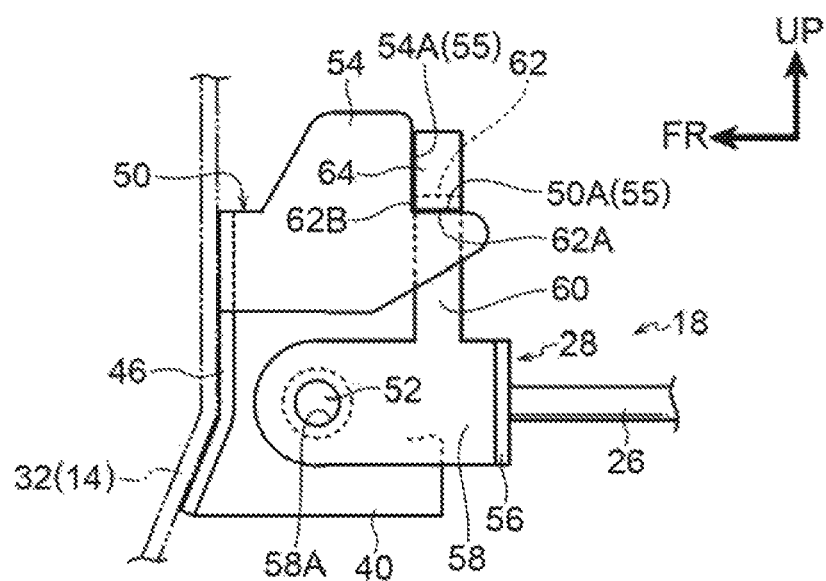
FIG. 8B is a side view corresponding to FIG. 8A.

Next, as illustrated in FIG. 8A and FIG. 8B, the vehicle body-side mounting portion 28 of the damper 18 is moved in the vehicle transverse direction towards the supporting wall 40 side of the bracket 34. As a consequence, the pin 52 that is fixed to the supporting wall 40 of the bracket 34 is inserted into the insertion hole 58A that is formed in the engaging piece 58 of the damper 18. As a result, the vehicle body-side mounting portion 28 of the damper 18 is engaged with the pin 52 of the bracket 34, and is consequently mounted to the vehicle main body 14 side.

From this state, as illustrated in FIG. 2, the back door-side mounting portion 30 at the cylinder 24 side of the damper 18 is mounted to the hinge arm 22. Note that the position of the back door-side mounting portion 30 of the damper 18 is located at the upward side of the position of the pin 52. Due to the above, in a case in which the back door-side mounting portion 30 of the damper 18 is mounted to the hinge arm 22, the back door-side mounting portion 30 of the damper 18 is made as rotate upwards in the direction illustrated by the arrow B around the pin 52 that is fixed to the supporting wall 40 the bracket 34.

Figure 9A:
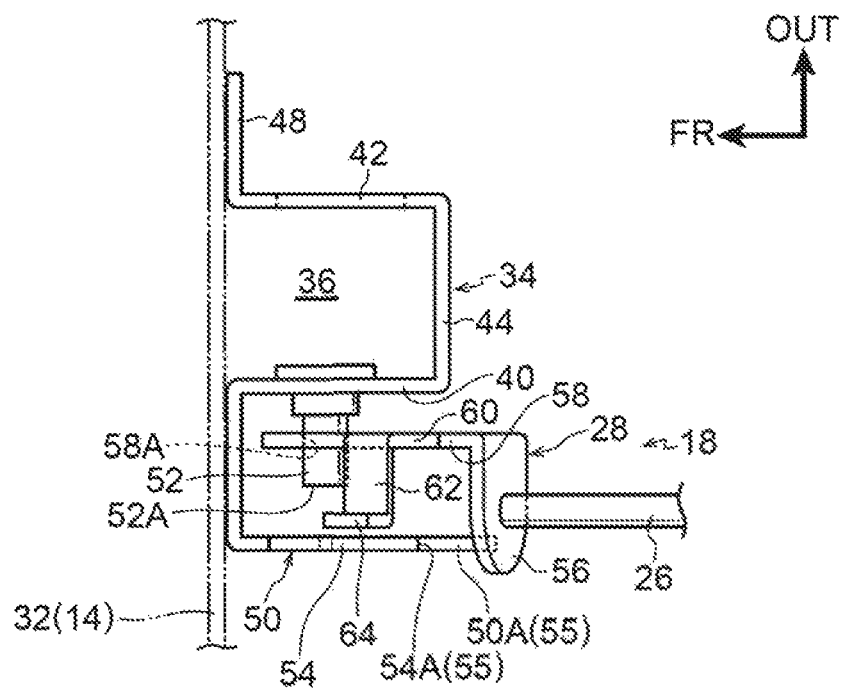
FIG. 9A is a plan view of the vehicle main body-side bracket and the vehicle body-side mounting portion of the damper illustrating a state in which the vehicle body-side mounting portion of the damper has been mounted to the vehicle main body in the vehicle back door device according to the present exemplary embodiment.
Figure 9B:
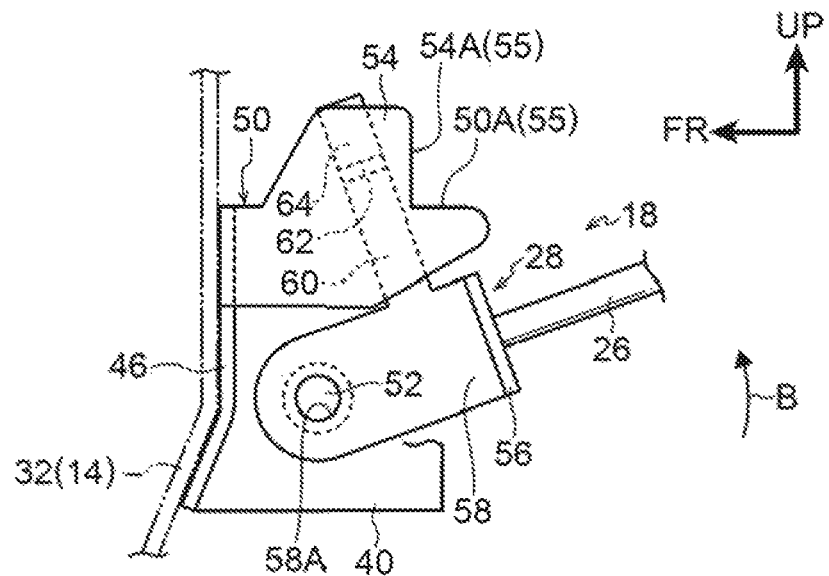
FIG. 9B is a side view corresponding to FIG. 9A.

Here, as illustrated in FIG. 9B, in a state in which the back door-side mounting portion 30 of the damper 18 has been rotated upwards in the direction illustrated by the arrow B around the pin 52, the abutting piece 62 and the restricting piece 64 that are formed in the engaging piece 58 of the damper 18 are set such that they overlap with the facing wall 50 of the bracket 34, when seen in a vehicle side view.

In other words, as illustrated in FIG. 2 and FIG. 3, in a state in which the back door-side mounting portion of the damper 18 has been mounted to the hinge arm 22, irrespective of whether the back door 16 is open or closed, a state in which the abutting piece 62 and the restricting piece 64 of the engaging piece 58 of the damper 18 overlap with the facing wall 50 of the bracket 34, when seen in a vehicle side view is maintained, as illustrated in FIG. 9B.

In this way, as illustrated in FIG. 9A and FIG. 9B, in a state in which the abutting piece 62 and the restricting piece 64 of the damper 18 are overlapping with the facing wall 50 of the bucket 34, even in a case in which the damper 18 is moved towards the center (i.e., towards the facing wall 50 side) in the vehicle transverse direction, the abutting piece 62 and the restricting piece 64 of the damper 18 abut against the facing wall 50 of the bracket 34, so that movement of this damper 18 in the vehicle transverse direction is restricted.

As a consequence a state in which the pin 52 of the bracket 34 remains inserted in the insertion hole 58A (i.e., is locked in place) is maintained, and the vehicle body-side mounting portion 28 of the damper 18 is mounted to the bracket 34. Note that the facing wall 50 of the bracket 34 is provided with sufficient strength and rigidity to prevent from being elastically deformed when the abutting piece 62 and the restricting piece 64 of the damper 18 are abutted against the facing wall 50.

Next, operations and effects of the vehicle back door device 10 according to the present exemplary embodiment will be described.

For example, when the mounting portion of a damper that is mounted so a bracket at the vehicle main body side is a ball joint mechanism (not illustrated in the drawings), a ball socket that is provided at the damper side is pressed against a ball stud that is provided at the bracket side so that the ball socket is externally fitted to the ball stud (an external fitting task). In this case, since force is required to press the ball socket to the ball stud, an operator must perform this external fitting task in as close proximity as possible to the ball stud.

Accordingly, in a case in which, for example, the ball stud is provided deep in the interior of the luggage space, the operator needs to lean forward into the interior of the luggage space from the rearward side of the vehicle, and to externally fit the ball socket over the ball stud while stretching their arms out as far as possible (this is known as overreaching). Due to the above, workability is extremely poor when assembling the damper to the vehicle main body, and the time required to complete the operation increases correspondingly.

In contrast to this, in the present exemplary embodiment, as illustrated in FIG. 4, the bracket 34 is formed so as to include the pin 52 and the positioning portion 55. Consequently, the vehicle body-side mounting portion 28 of the damper 18 is supported by the pin 52, and the abutting portion 62 provided at the vehicle body-side mounting portion 28 of the damper 18 is capable of abutting against the positioning portion 55.

In addition, in the present exemplary embodiment, the distance L1 (i.e., the first distance), which is the distance between the upper end surface 50A of the positioning portion 55 and the axial center Q of the pin 52 in the vehicle up-down direction, is set so as to be the same as the distance L2 (i.e., the second distance), which is the distance between the bottom surface 62A of the abutting piece 62 and the hole center R of the insertion hole 58A of the damper 18 in the vehicle up-down direction. Furthermore, the distance L3 (i.e., the third distance), which is the distance between the rear end surface 54A of the positioning portion 55 and the axial center Q of the pin 52 in the vehicle front-rear direction, is set so as to be the same as the distance L4 (i.e., the fourth distance), which is the distance between the front surface 62B of the abutting piece 62 and the hole center R of the insertion hole 58A in the vehicle front-rear direction.

Due to the above, in a case in which the bottom surface 62A and the front surface 62B of the abutting piece 62 of the damper 18 are abutted respectively against the upper end surface 50A and the rear end surface 54A of the positioning portion 55 of the bracket 34, then the hole center R of the insertion hole 58A in the damper 18 is disposed coaxially with the axial center Q of the pin 52 of the bracket 34. In other words, the vehicle body-side mounting portion 28 of the damper 18 is positioned in the vehicle up-down direction and in the vehicle front-rear direction relative to the bracket 34.

In addition, as illustrated in FIG. 4, FIG. 7A and FIG. 7B, in a case in which the vehicle body-side mounting portion 28 of the damper 18 is positioned in the vehicle up-down direction and in the vehicle front-rear direction relative to the bracket 34, then in a case in which the abutting piece 62 is moved in the vehicle transverse direction, as illustrated in FIG. 4, FIG. 8A and FIG. 8B the vehicle body-side mounting portion 28 of the damper 18 is supported by the pin 52.

In other words, in the present exemplary embodiment, simply by causing the abutting piece 62 provided at the vehicle body-side mounting portion 28 of the damper 18 to abut against the positioning portion 55 of the bracket 34, the vehicle body-side mounting portion 28 of the damper 18 is positioned in the vehicle up-down direction and in the vehicle front-rear direction relative to the bracket 34. In addition, in this state, simply by moving the abutting piece 62 in the vehicle transverse direction, the pin 52 of the bracket 34 is inserted to the insertion hole 58A in the damper 18, and the vehicle body-side mounting portion 28 of the damper 18 can thus be supported by the bracket 34.

Due to the above, in the present exemplary embodiment, as described above, the force that has hitherto been required to assemble the ball joint mechanism is no longer required. Accordingly, as illustrated in FIG. 6, there is no need for an operator P to work in close proximity to the pin 52, and while standing at the rear of the vehicle 12 and gripping the back door-side mounting portion 50 of the damper 18. the operator P is able to support the vehicle body-side mounting portion 28 of the damper 18 by the pin 52 of the supporting wall 40 of the bracket 34.

Namely, even in a case in which the pin 52 is provided deep is the interior of the luggage space 20, the operator P is able to easily cause the vehicle body-side mounting portion 28 of the damper 18 to be supported by the supposing wall 40 without having to adopt a strained posture such as overreaching or the like. As a result, workability when mounting the damper 18 may be improved and the work time may be shortened.

It should be noted that, in the present exemplary embodiment, the angle of disposition of the damper 18 when mounting the vehicle body-side mounting portion 28 of the damper 18 to the vehicle main body 14 (as illustrated in FIG. 1) is different from the angle of disposition of the damper when mounting the back door-side mounting portion 30 of the damper 18 to the back door 16 (as illustrated so FIG. 2).

In the present exemplary embodiment, this fact is used to make the facing wall 50 of the bracket 34 overlap with the restricting piece 64 provided at the vehicle body-side mounting portion 28 of the damper 18 when seen in a vehicle side view after the back door-side mounting portion 30 of the damper 18 has been mounted to the back door 16. As a result, the pin 52 of the bracket 34 is prevented from coming free (i.e., is locked into) the insertion hole 58A of the damper 18. By employing this structure, compared, for example, with a structure in which a separate locking portion (not illustrated in the drawings) is provided in the bracket, the structure of the bracket may be simplified.

Moreover, in the present exemplary embodiment, as illustrated in FIG. 4 and FIG. 9B, the positioning portion 55 is provided at the facing wall 50, and the abutting piece 62 and the restricting piece 64 are able to overlap with the facing wall 50 when seen in a vehicle side view. In other words, the facing wall 50 is provided with two functions, namely, a function of positioning the vehicle body-side mounting portion 28 of the damper 18 in the vehicle up-down direction and the vehicle front-rear direction relative to the bracket 34, and a function of locking the vehicle body-side mounting portion 28 of the damper 18 in the vehicle transverse direction. Meanwhile, the abutting piece 62 provided at the vehicle body-side mounting portion 28 of the damper 18 is also provided with two functions, namely, a function of positioning the facing wall 50 in the vehicle up-down direction and the vehicle front-rear direction relative to the bracket 34, and a function of locking the facing wall 50 in the vehicle transverse direction.

In this way, by providing a single component with a plurality of functions, the configuration of each component can be simplified compared to a case in which separate portions are formed respectively in order to perform each individual function.

Furthermore, in the present exemplary embodiment, as illustrated in FIG. 4, the positioning portion 55 at the bracket 34 side is formed so as to include the rear end surface 54A that serves as a bracket-side vertical surface, and the upper end surface 50A that serves as a bracket-side horizontal surface. In addition, the rear end surface 54A extends in the vehicle up-down direction and in the vehicle transverse direction in the bracket 34, and determines the position of the bracket 34 in the vehicle front-rear direction. The upper end surface 50A extends in the vehicle front-rear direction and in the vehicle transverse direction in the bracket 34, and determines the position of the bracket 34 in the vehicle up-down direction.

In contrast, the damper-side abutting piece 62 is formed to include the front surface 62B that serves as a damper-side vertical surface, and the bottom surface 62A that serves as a damper-side horizontal surface. The abutting piece 62 is provided such that it is able to abut against the rear end surface 54A from the rearward side of the rear end surface 54A at the bracket 34 side. Moreover, the bottom surface 62A of the abutting piece 62 is provided such that it is able to abut against the upper end surface 50A from the upward side of the upper end surface 50A at the bracket 34 side.

Namely, simply by causing the abutting piece 62 at the damper 18 side to abut from the rearward side and the upward side against the rear end surface 54A and the upper end surface 50A at the bracket 34 side, the abutting piece 62 is able to position the bracket 34 in the vehicle front-rear direction and in the vehicle up-down direction.

In this way, by positioning the abutting piece 62 at the damper 18 side relative to the positioning portion 55 of the bracket 34 from the rearward side and the upward side, it is possible to avoid interference with components disposed at the rearward side and at the downward side of the bracket 34.

(Supplement to the Present Exemplary Embodiment)

In the present exemplary embodiment, the insertion hole 58A is provided at the vehicle body-side mounting portion 28 of the damper 18, and the pin 52 is provided at the bracket 34 side. However, since it is sufficient if the vehicle body-side mounting portion 28 of the damper 18 is able its be rotatably supported by the supporting wall 40, it is also possible for the pin to be provided at the vehicle body-side mounting portion 28 side and for the insertion hole to be formed at the bracket 34 side.

Moreover, in the present exemplary embodiment, as illustrated in FIG. 4, FIG. 7A and FIG. 7B, the facing wall 50 provided at the bracket 34 is provided with two functions, namely, a function of positioning the vehicle body-side mounting portion 28 of the damper 18 in the vehicle up-down direction and the vehicle front-rear direction of the bracket 34, and a function of kicking the vehicle body-side mounting portion 28 of the damper 18 in the vehicle transverse direction. However, it is not essential that the facing wall 50 be provided with these two functions. Consequently, it is also possible for the facing wall 50 to have only one of these functions, and for a component having the other of the two functions to be provided separately in the bracket 34.

Meanwhile, the abutting piece 62 provided at the vehicle body-side mounting portion 28 of the damper 18 is also provided with two functions, namely, a function of positioning the bucket 34 in the vehicle up-down direction and the vehicle front-rear direction, and a function of locking the bracket 34 in the vehicle transverse direction. However, in the same way as for the facing wall 50, it is not essential that the abutting piece 62 be provided with these two function.

Furthermore, in the present exemplary embodiment, as a result of the vehicle body-side mounting a portion 28 of the damper 18 illustrated in FIG. 4, FIG. 9A and FIG. 9B abutting against the facing wall 50 of the bracket 34, movement of the vehicle body-side mounting portion 28 of the damper 18 in the vehicle transverse direction is restricted. However, as illustrated in FIG. 2, since it is only necessary that movement of the vehicle body-side mounting portion 28 of the damper 18 in the vehicle transverse direction be restricted when the back door-side mounting portion 30 of the damper 18 has been mounted to the back door 16, the present invention is not limited to this structure. For example, it is also possible to provide the pin 52 with a locking function by lengthening the pin 52.

(Additional Exemplary Embodiments)

Next, modified examples of the above-described exemplary embodiment will be described. Note that component elements that are essentially the same as in the above-described exemplary embodiment are given the same descriptive symbols and any description thereof is omitted.

(1) In the above-described exemplary embodiment, as illustrated in FIG. 4, the pin 52 at which the vehicle body-side mounting portion 28 of the damper 18 is supported is provided at the supporting wall 40 of the bracket 34 that is located at the inner side in the vehicle transverse direction of the luggage space 20 (see FIG. 6). In addition this pin 52 protrudes from the bracket 34 towards the inner side in the vehicle transverse direction of the luggage space 20. However, the present invention is not limited to this. For example, it is also possible for the supporting wall to be disposed at the outer side in the vehicle transverse direction of the luggage space (this is not illustrated in the drawings). In this case, the pin protrudes from the bracket towards the outer side in the vehicle transverse direction of the luggage space.

(2) Moreover, in the above-described exemplary embodiment, as illustrated in FIG. 4, the restricting piece 64 extends from the abutting piece 62 of the vehicle body-side mounting portion 28 of the damper 18. In addition, the abutting piece 62 and the restricting piece 64 are set such that they overlap with the facing wall 50 of the bracket 34 when seen in a vehicle side view, when the back door-side mounting portion 30 of the damper 18 has been mounted so the back door 16.

However, since it is only necessary for at least a portion of the vehicle body-side mounting portion 28 of the damper 18 to overlap with the facing wall 50 when the back door-side mounting portion 30 of the damper 18 has been mounted to the back door 16, the configuration of the vehicle body-side mounting portion 28 side is not limited to this.

Figure 10:
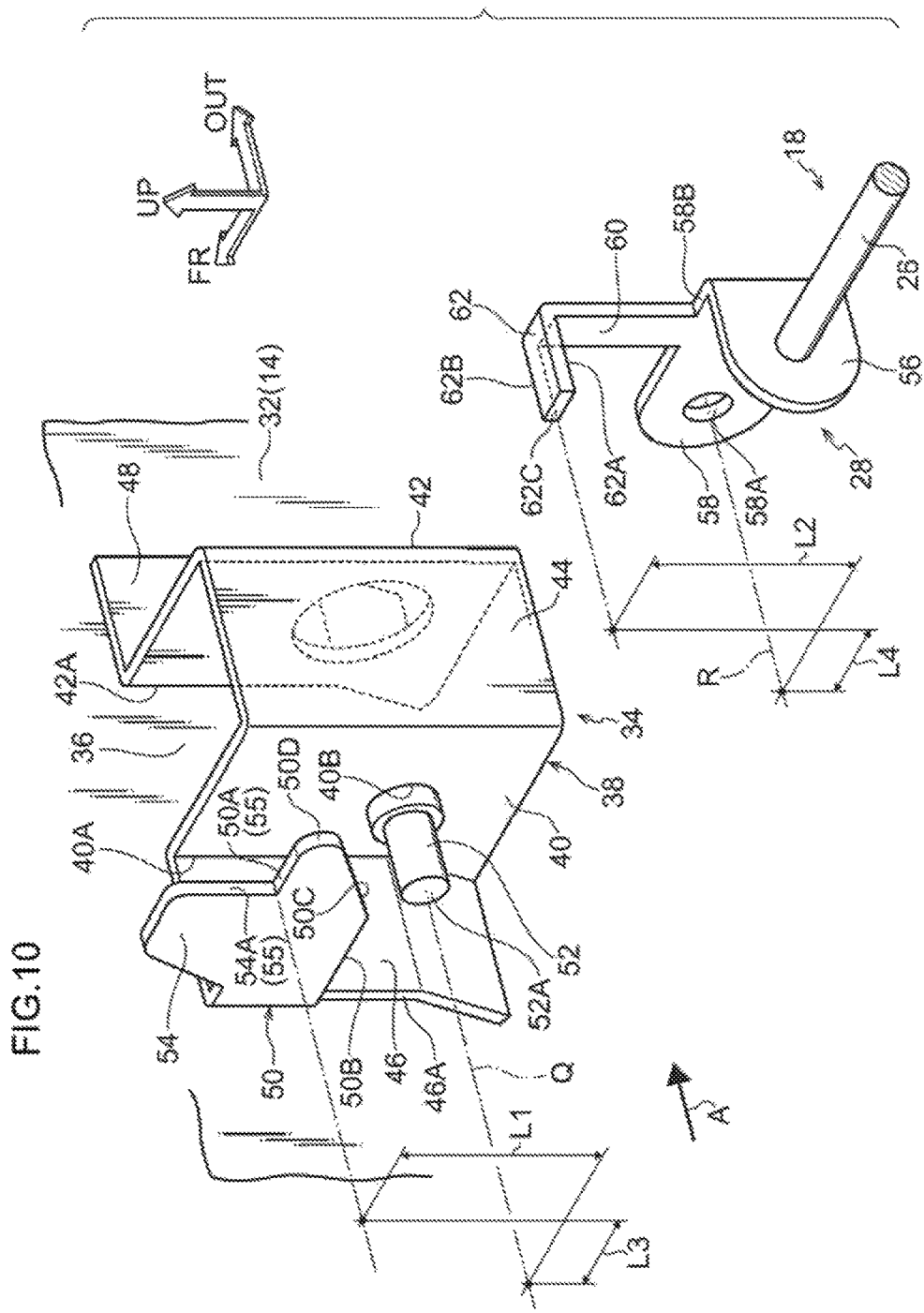
FIG. 10 is a perspective view corresponding to FIG. 4 illustrating a modified example (1) of the vehicle back door device according to the present exemplary embodiment.

For example, as illustrated in FIG. 10, the restricting piece 64 is not always necessary at the vehicle body-side mounting portion 28. In this case, a distal end surface 62C of the abutting piece 62 overlaps with the facing wall 50 of the bracket 34 when seen in a vehicle side view, when the back door-side mounting portion 30 of the damper 18 has been mounted to the back door 16. In the present exemplary embodiment, the size of the overlap with the facing wall 50 is reduced by an amount corresponding to the size of the omitted restricting piece 64 (see FIG. 4). However, employing this structure may enable the configuration of the vehicle body-side mounting portion 28 of the damper 18 to be simplified.

(3) Moreover, in the above-described exemplary embodiment, as illustrated in FIG. 4, the positioning portion 55 is provided at the bracket 34 side, and the abutting piece 62 is provided at the vehicle body-side mounting portion 28 side of the damper 18. In addition, by causing this abutting piece 62 to abut against the positioning portion 55 from the rearward side and the upward side, the vehicle body-side mounting portion 28 of the damper 18 is positioned in the vehicle front-rear direction and the vehicle up-down direction relative to the bracket 34.

However, since it is sufficient for the vehicle body-side mounting portion 28 of the damper 18 to be positioned in the vehicle front-rear direction and the vehicle up-down direction relative to the bracket 34, the present invention is not limited to this structure.

Figure 11:
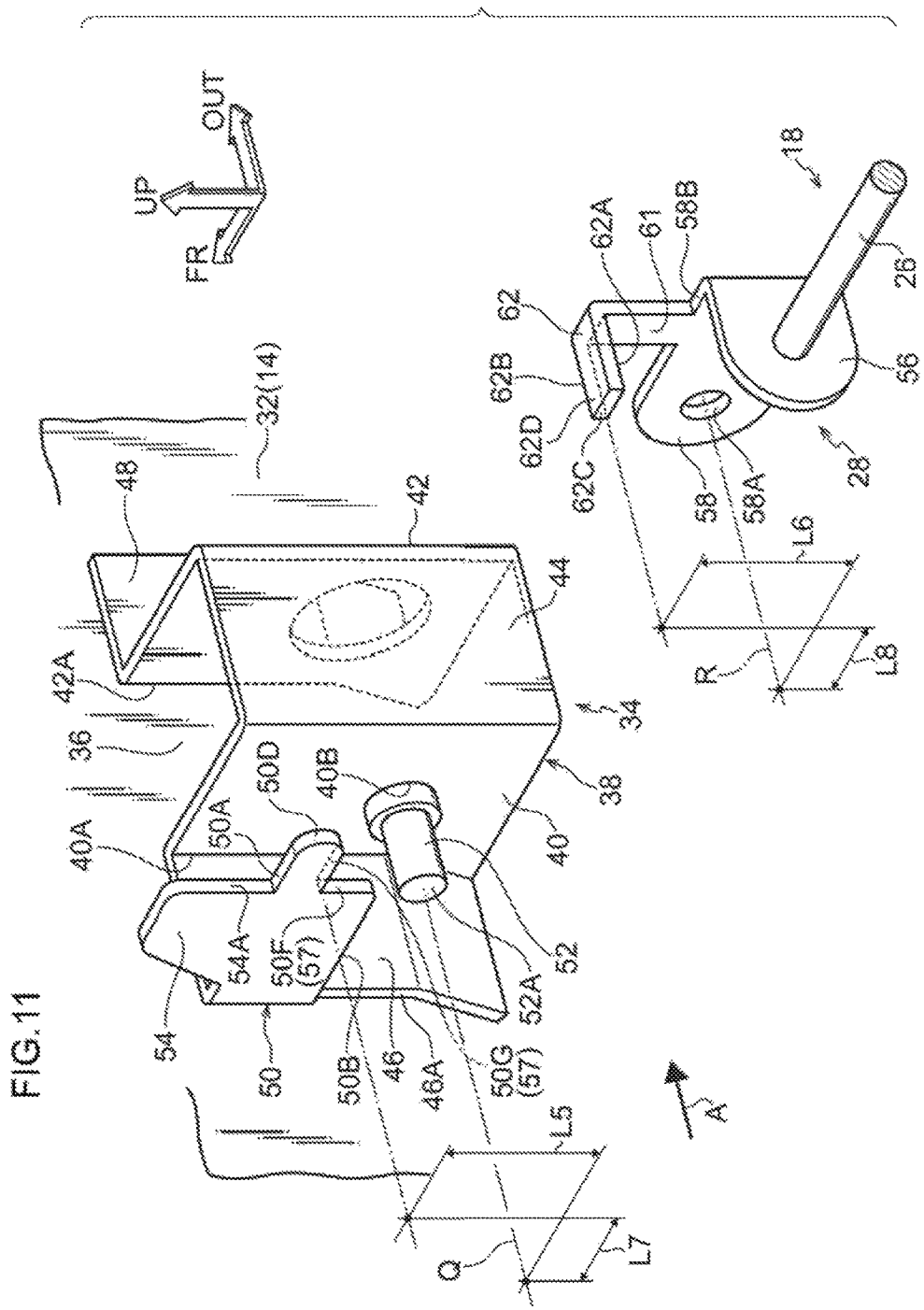
FIG. 11 is a perspective view corresponding to FIG. 4 illustrating a modified example (2) of the vehicle back door device according to the present exemplary embodiment.

For example, as illustrated in FIG. 11, the abutting piece 62 may be abutted against a positioning portion 57 from the rearward side and the underside thereof. In this case, the restricting piece 64 (see FIG. 4) is not formed in the abutting piece 62. In addition, a positioning portion 57 is cut into the facing wall 50 at the rear portion of the lower end surface 50B. This positioning portion 57 is formed by a rear end surface (i.e., a bracket-side vertical surface) 50F that is formed extending in the vehicle up-down direction and in the vehicle transverse direction, and a lower end surface (i.e., a bracket-side horizontal surface) 50G that is formed extending in the vehicle front-rear direction and the vehicle transvers direction.

The front surface 62B of the abutting piece 62 at the damper 18 side abuts against the rear end surface 50F of the positioning portion 57, and a upper surface 62D of the abutting piece 62 which serves as a damper-side horizontal surface at the damper 18 side abuts against the lower end surface 50G of the positioning portion 57.

Due to the above, in the present exemplary embodiment, a distance L5 (i.e., a fifth distance), which is a distance between the lower end surface 50G of the positioning portion 57 and the axial center Q of the pin 52 in the vehicle up-down direction, is set so as to be the same as a distance L6 (i.e., a sixth distance), which is a distance between the upper surface 62D of the abutting piece 62 and the hole center R of the insertion hole 58A of the damper 18 in the vehicle up-down direction. Furthermore, a distance L7 (i.e., a seventh distance), which is a distance between the rear end surface 50F of the positioning portion 57 and the axial center Q of the pin 52 in the vehicle front-rear direction, is set so as to be the same as a distance L8 (i.e., an eighth distance), which is a distance between the front surface 62B of the abutting piece 62 and the hole center R of the insertion hole 58A in the vehicle front-rear direction.

As a consequence, in a case in which the upper surface 62D and front surface 62B of the abutting piece 62 of the damper 18 are abutted respectively against the lower end surface 50G and rear end surface 50F of the positioning portion 57 of the bracket 34, the hole center R of the insertion hole 58A in the damper 18 is disposed coaxially with the axial center Q of the pin 52 of the bracket 34. In other words, the vehicle body-side mounting portion 28 of the damper 18 is positioned in the vehicle up-down direction and the vehicle front-rear direction relative to the bracket 34. Note that, in this case, since the length of an extended piece 61, to which the abutting piece 62 is formed, can be made shorter than the length of the extended piece 60 illustrated in FIG. 4, the shape of the vehicle body-side mounting portion 28 of the damper is may be made more compact.

Figure 12:
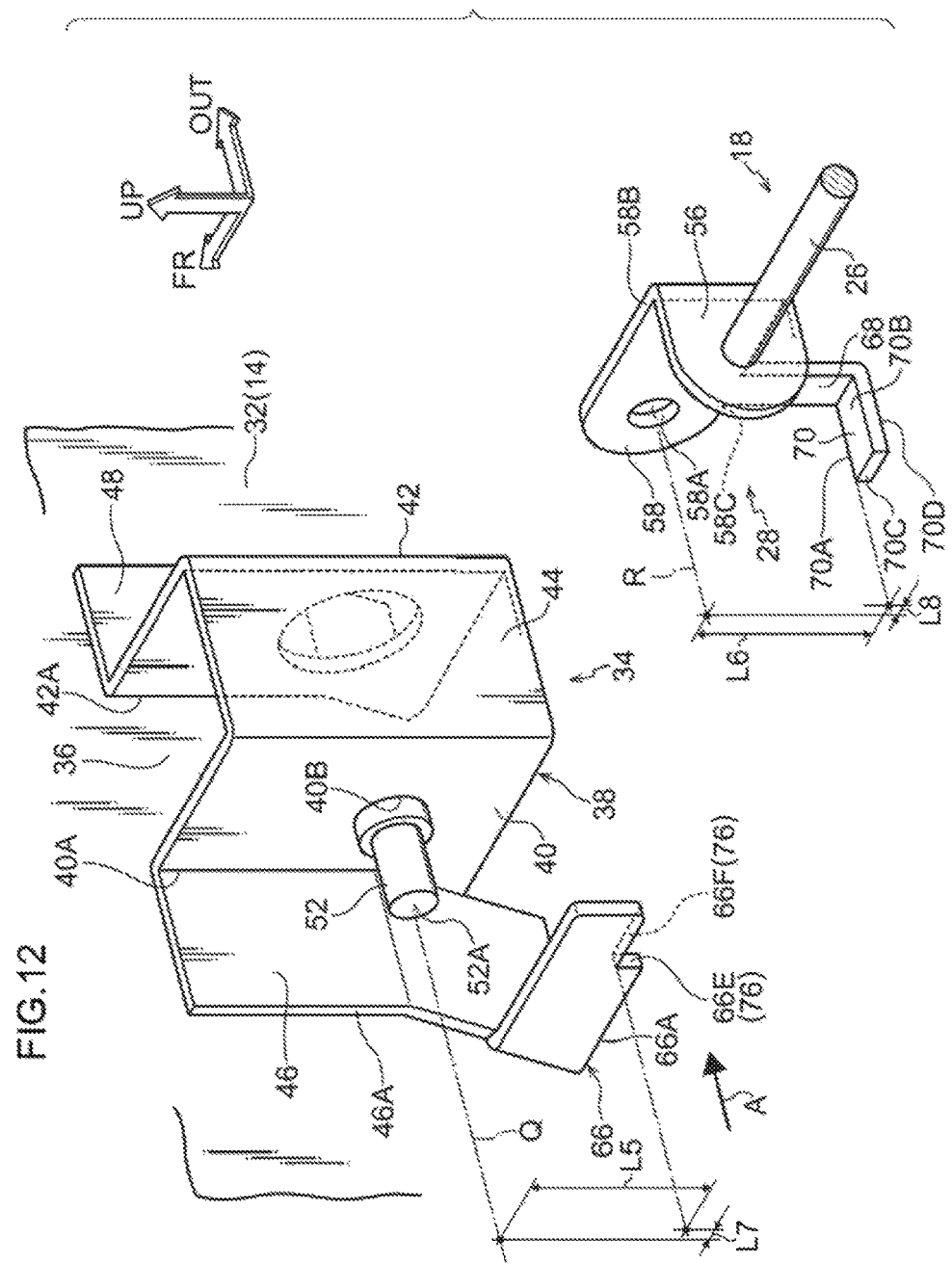
FIG. 12 is a perspective view corresponding to FIG. 4 illustrating a modified example (3) of the vehicle back door device according to the present exemplary embodiment.

(4) Furthermore, in the above-described exemplary embodiment, as illustrated in FIG. 4, the facing wall 50 is provided at the upper side of the pin 52 that is provided at the supporting wall 40 of the bracket 34. However, as illustrated in FIG. 12, it is also possible for a facing wall 66 to be provided at the lower side of the pin 52.

In this case, in the same way as for the positioning portion 57 illustrated in FIG. 11, a positioning portion 67 is formed at the bracket 34 side by cutting a notch into the rear portion of a lower end surface 66A of the facing wall 66. This positioning portion 67 is formed by a rear end surface (i.e. a bracket-side vertical surface) 66B that is formed extending in the vehicle up-down direction and in the vehicle transverse direction, and a lower end surface (i.e., a bracket-side horizontal surface) 66C that is formed extending in the vehicle front-rear direction and the vehicle transverse direction.

On the other hand, in the vehicle both side mounting portion 28 of the damper 18, the extended piece 68 extends downward from a lower end 58C the engaging piece 58. An abutting piece 70 is provided at a distal end portion of the extended piece 68. A front surface 70A, which is serving as a damper-side vertical surface, of the abutting piece 70 abuts against the rear end surface 66B from the rearward side of the positioning portion 67, while an upper surface 70B thereof, which is serving as a damper-side horizontal surface, abuts against the lower end surface 66C from underneath the positioning portion 67.

Due to the above, in the present exemplary embodiment, the distance L5 (i.e., the fifth distance), which is the distance between the lower end surface 66C of the positioning portion 67 and the axial center Q of the pin 52 in the vehicle up-down direction, is set so as to be the same as the distance L6 (i.e., the sixth distance), which is the distance between the upper surface 70B of the abutting piece 70 and the hole center R of the insertion hole 58A of the damper 18 in the vehicle up-down direction. Furthermore, the distance L7 (i.e., the seventh distance), which is the distance between the rear end surface 66B of the positioning portion 67 and the axial center Q of the pin 52 in the vehicle front-rear direction, is set so as to be the same as the distance L8 (i.e., the eight distance), which is the distance between the front surface 70A of the abutting piece 70 and the hole center R of the insertion hole 58A in the vehicle front-rear direction.

As a consequence, in a case in which the upper surface 70B and front surface 70A of the abutting piece 70 of the damper 18 are abutted respectively against the lower end surface 66C and rear end surface 66B of the positioning portion 67 of the bracket 34, the hole center R of the insertion hole 58A in the damper 18 is disposed coaxially with the axial center Q of the pin 52 of the bracket 34. In other words, the vehicle body-side mounting portion of the damper 18 positioned in the vehicle up-down direction and the vehicle front-rear direction relative to the bracket 34.

In addition, when the back door-side mounting portion 30 of the damper 18 is mounted to the back door 16, a distal end surface 70C of the abutting piece 70 overlaps with the facing wall of the bracket 34, when see it in a vehicle side view.

In this way, by positioning the abutting piece 70 at the damper 18 side relative to the positioning portion 67 of the bracket 34 from the rearward side and the upward side, it is possible to avoid interference with components disposed at the rearward side and at the downward side of the bracket 34.

Figure 13:
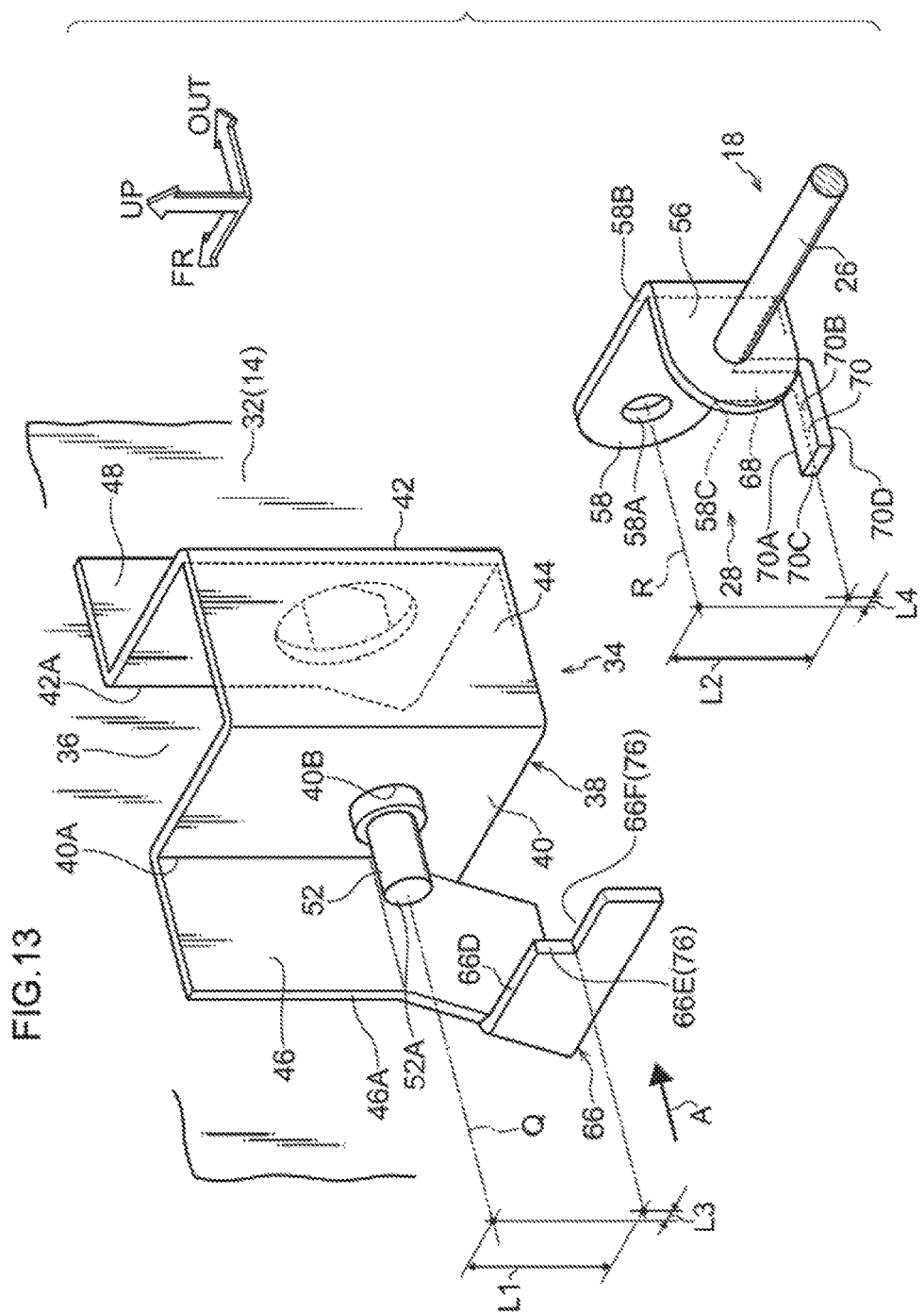
FIG. 13 is a perspective view corresponding to FIG. 4 illustrating a modified example (4) of the vehicle back door device according to the present exemplary embodiment.

(5) Furthermore, as illustrated in FIG. 13, it is also possible for a bracket 34-side positioning portion 76 to be formed by cutting a notch into the rear portion of an upper end surface 66D of the facing wall 66. This positioning portion 76 is formed by a rear end surface (i.e., a bracket-side vertical surface) 66E that is formed extending in the vehicle up-down direction and in the vehicle transverse direction, and an upper end surface (i.e., a bracket-side horizontal surface) 66F that is formed extending in the vehicle front-rear direction and the vehicle transverse direction.

In this case, the front surface 70A, which is serving as a damper-side vertical surface, of the abutting piece 70 at the vehicle body-side mounting portion 28 of the damper 18 abuts against the rear end surface 66E from the rearward side of the positioning portion 67, while the lower surface 70D thereof, which is serving as a damper-side horizontal surface, abuts against the upper end surface 66F from the upper side of the positioning portion 76.

Due to the above, in the present exemplary embodiment, the distance L1 (i.e., the first distance), which is the distance between the upper end surface 66F of the positioning portion 76 and the axial center Q of the pin 52 in the vehicle up-down direction, is set so as to be the same as the distance L2 (i.e., the second distance), which is the distance between the lower surface 70D of the abutting piece 70 and the hole center R of the insertion hole 58A of the damper 18 in the vehicle up-down direction. Furthermore, the distance L3 (i.e., the third distance), which is the distance between the rear end surface 66E of the positioning portion 76 and the axial center Q of the pin 52 in the vehicle front-rear direction, is set so as to be the same as the distance L4 (i.e., the fourth distance), which is the distance between the front surface 70A of the abutting piece 70 and the hole center R of the insertion hole 58A in the vehicle front-rear direction.

As a consequence, in a case in which the lower surface 70D and front surface 70A of the abutting piece 70 of the damper 18 are abutted respectively against the upper end surface 66F and rear end surface 66E of the positioning portion 76 of the bracket 34, the hole center R of the insertion hole 58A in the damper 18 is disposed coaxially with the axial center Q of the pin 52 of the bracket 34. In other words, the vehicle body-side mounting portion 28 of the damper 18 is positioned in the vehicle up-down direction and the vehicle front-rear direction relative to the bracket 34.

Note that, in the exemplary embodiments illustrated in FIG. 12 and FIG. 13, the facing wall 66 is provided at the lower side of the pin 52. In this case, compared to a case in which the facing wall 50 is provided at the upper side of the pin 52, as illustrated in FIG. 4, when the back door-side mounting portion 30 of the damper 18 has been mounted to the door 16, as illustrated in FIG. 2, the abutting piece 70 illustrated in FIG. 12 and FIG. 13 moves in a direction away from the facing wall 66.

Figure 14A:
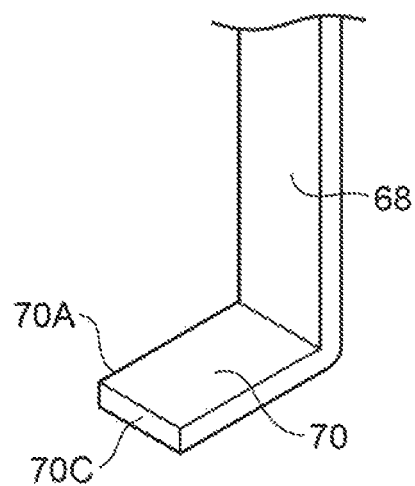
FIG. 14A is a perspective view illustrating an abutting piece at the vehicle body-side mounting portion side of the damper in the modified example (3) and (4) of the vehicle back door device according to the present exemplary embodiment.
Figure 14B:
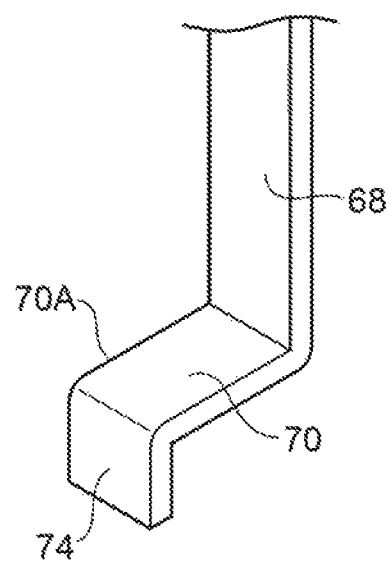
FIG. 14B is a perspective view illustrating a modified example of the abutting piece illustrated in FIG. 14A.

Due to the above, the amount that the distal end surface 70C of the abutting piece 70 overlaps with the facing wall 66 is smaller compared to a case in which the facing wall 50 is provided at the upper side of the pin 52 (see FIG. 4). Accordingly, at the present exemplary embodiment, in order to increase the amount of this overlap is also possible, as illustrated in FIG. 14B, to provide a restricting piece 74 that extends in a downward direction from the distal end surface 70C of the abutting piece 70 (see FIG. 14A).

An example of an exemplary embodiment of the present disclosure has been described above, however, it should be understood that exemplary embodiments of the present disclosure are not limited to that described above. The exemplary embodiment and various modified examples thereof may also be used in other suitable combinations, and may be implemented in a variety of aspects insofar as these do not depart from the spirit or scope of the present invention.

What is claimed is:
1. A vehicle back door device comprising:
  a back door supported such that the back door is able to open and close at a vehicle main body; and
  a damper provided such that the damper is able to extend and retract between the vehicle main body and the back door, the damper including one end portion in an extension/retraction direction mounted to the vehicle main body via a bracket fixed to the vehicle main body and another end portion in the extension/extraction direction mounted to the back door, and the damper dampening urging force that urges the back door or a direction in which the back door opens, the bracket comprising:

a supporting portion that supports the one end portion in the extension/retraction direction of the damper; and a positioning portion formed facing the supporting portion in a vehicle transverse direction, the positioning portion being abutted against by an abutting portion provided at the one end portion in the extension/retraction direction of the damper, the supporting portion comprising:

a supporting wall disposed along a vehicle front-rear direction and a vehicle up-down direction; and, a pin provided at the supporting wall, an axial direction of the pin extending in the vehicle transverse direction, a first distance in the vehicle up-down direction between an upper end surface of the positioning portion and art axial center of the pin being set to be equal to a second distance in the vehicle up-down direction between a lower surface of the abutting portion and a hole center of an insertion hole provided in the abutting portion, and a third distance in the vehicle front-rear direction between a rear end surface of the positioning portion and an axial center of the pin being set to be equal to a fourth distance in the vehicle front-rear direction between a front surface of the abutting portion and the hole center of the insertion hole.

2. The vehicle back door device according to claim 1, wherein:

the other end portion in the extension/retraction direction of the damper is mounted to the back door at an upper side in the vehicle up-down direction of the position of the pin; and a facing wall, provided at the bracket, faces the supporting portion in the vehicle transverse direction, and, when the other end portion in the extension/retraction direction of the damper is mounted to the back door, the facing wall overlaps with the one end portion in the extension/retraction direction of the damper when seen in a vehicle side view.

3. The vehicle back door device according to claim 2, wherein the positioning portion is provided at the facing wall, and the abutting portion is capable of overlaps with the facing wall when seen in a vehicle side view.

4. The vehicle back door device according to claim 1, wherein the positioning portion includes:

a bracket-side vertical surface, disposed at the bracket and extending in the vehicle up-down direction and the vehicle transverse direction, the bracket-side vertical surface being used to position the bracket in the vehicle front-rear direction, and a bracket-side horizontal surface, joined to the bracket-side vertical surface, and disposed at the bracket extending in the vehicle front-rear direction and the vehicle transverse direction, the bracket-side horizontal surface being used to position the bracket in the vehicle up-down direction, and the abutting portion includes:

a damper-side vertical surface provided in such a way that the damper-side vertical surface is capable of abutting against the bracket-side vertical surface from a rearward side in the vehicle front-rear direction of the bracket-side vertical surface; and a damper-side horizontal surface provided in such a way that the damper-side horizontal surface is capable of abutting against the bracket-side horizontal surface from an upper side at the vehicle up-down direction of the bracket-side horizontal surface.

5. A vehicle back door device comprising:

a back door supported such that the back door is able is open and close at a vehicle main body; and a damper provided such that the damper is able to extend and retract between the vehicle main body and the back door, the damper including one end portion in an extension/retraction direction mounted to the vehicle main body via a bracket fixed to the vehicle main body and another end portion in the extension retraction direction mounted to the back door, and the damper dampening urging force that urges the back door in a direction in which the back door opens, the bracket comprising:

a supporting portion that supports the one end portion in the extension/retraction direction of the damper; and a positioning portion formed facing the supporting portion in a vehicle transverse direction, the positioning portion being abutted against by an abutting portion provided at the one end portion in the extension/retraction of the damper, the supporting portion comprising:

a supporting wall disposed along a vehicle front-rear direction and a vehicle up-down direction; and a pin provided at the supporting wall, an axial direction of the pin extending in the vehicle transverse direction, a fifth distance in the vehicle up-down direction between a lower end surface of the positioning portion and an axial center of the pin being set to be equal to a sixth distance in the vehicle up-down direction between an upper surface of the abutting portion and a hole center of an insertion hole provided in the abutting portion, and a seventh distance in the vehicle front-rear direction between a rear end surface of the positioning portion and an axial center of the pin being set to be equal to an eighth distance in the vehicle front-rear direction between a front surface of the abutting portion and the hole center of the insertion hole.

6. The vehicle back door device according to claim 5, wherein:

the other end portion in the extension/retraction direction of the damper is mounted to the back door at an upper side in the vehicle up-down direction of the position of the pin; and a facing wall, provided at the bracket, faces the supporting portion in the vehicle transverse direction and when the other end portion in the extension/retraction direction of the damper is mounted to the back door, the facing wall overlaps with the one end portion in the extension/retraction direction of the damper when seen in a vehicle side view.

7. The vehicle back door device according to claim 6, wherein the positioning portion is provided at the facing wall, and the abutting portion is capable of overlapping with the facing wall when seen in a vehicle side view.

8. The vehicle back door device according to claim 5, wherein the positioning portion includes:

a bracket-side vertical surface, disposed at the bracket, and extending in the vehicle up-down direction and the vehicle transverse direction, the bracket-side vertical surface being used to position the bracket in the vehicle front-rear direction; and a bracket-side horizontal surface, joined to the bracket-side vertical surface, and disposed at the bracket extending in the vehicle front-rear direction and the vehicle transverse direction, the bracket-side horizontal surface being used to position the bracket in the vehicle up-down direction, and the abutting portion includes:

a damper-side vertical surface provided in such a way that the damper-side vertical surface is capable of abutting against the bracket-side vertical surface from a rearward side in the vehicle front-rear direction of the bracket-side vertical surface; and a damper-side horizontal surface provided in such a way that the damper-side horizontal surface is capable of abutting against the bracket-side horizontal surface from a lower side in the vehicle up-down direction of the bracket-side horizontal surface.

* * * * *